United States Patent
Keller et al.

(10) Patent No.: US 8,376,282 B2
(45) Date of Patent: *Feb. 19, 2013

(54) COLLAPSIBLE STRUCTURES

(75) Inventors: Philip N. Keller, Longmont, CO (US);
Robert Taylor, Superior, CO (US);
Doug Richardson, Westminster, CO (US); Adam G. Gray, Broomfield, CO (US)

(73) Assignee: Composite Technology Development, Inc., Lafayette, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/302,668

(22) Filed: Nov. 22, 2011

(65) Prior Publication Data
US 2012/0090660 A1 Apr. 19, 2012

Related U.S. Application Data

(63) Continuation-in-part of application No. 13/014,299, filed on Jan. 26, 2011, now Pat. No. 8,109,472, which is a continuation of application No. 12/873,615, filed on Sep. 1, 2010, now Pat. No. 8,061,660, which is a continuation of application No. 11/695,163, filed on Apr. 2, 2007, now Pat. No. 7,806,370.

(60) Provisional application No. 61/310,205, filed on Mar. 3, 2010, provisional application No. 60/788,449, filed on Mar. 31, 2006.

(51) Int. Cl.
*B64G 1/22* (2006.01)

(52) U.S. Cl. ............... 244/172.7; 244/173.3; 244/172.6; 136/245; 136/292

(58) Field of Classification Search ............... 244/159.4, 244/159.5, 159.6, 172.6, 120, 119, 122 A, 244/158.1, 172.7, 173.3; 136/245, 292; 52/528, 52/653.1, 653.2
See application file for complete search history.

(56) References Cited

U.S. PATENT DOCUMENTS

| | | | |
|---|---|---|---|
| 3,165,751 A | | 1/1965 | Clark |
| 3,473,758 A | * | 10/1969 | Valentijn ............... 244/172.7 |
| 3,477,662 A | * | 11/1969 | Anderson ............... 244/172.7 |
| 3,510,086 A | * | 5/1970 | Lanz et al. ............. 244/172.6 |
| 3,735,942 A | | 5/1973 | Palz |
| 3,735,943 A | | 5/1973 | Fayet |
| 3,817,481 A | | 6/1974 | Berks et al. |
| 3,819,417 A | | 6/1974 | Haynos |
| 3,863,870 A | | 2/1975 | Andrews et al. |
| 4,133,501 A | | 1/1979 | Pentlicki |
| 4,475,323 A | | 10/1984 | Schwartzberg et al. |

(Continued)

OTHER PUBLICATIONS

International Search Report and Written Opinion of PCT/US2011/023782 mailed on Apr. 20, 2011, 7 pages.

(Continued)

*Primary Examiner* — Tien Dinh
*Assistant Examiner* — Justin Benedik
(74) *Attorney, Agent, or Firm* — Kilpatrick Townsend & Stockton LLP

(57) ABSTRACT

Collapsible solar array structures are disclosed that include a collapsible structure and detachable solar array. The solar array can be detached stowed separately from the collapsible structure. The collapsible structure can include a plurality of longerons and/or support structures. Longerons can have a slit along a longitudinal length of the longeron.

31 Claims, 23 Drawing Sheets

U.S. PATENT DOCUMENTS

| | | | |
|---|---|---|---|
| 4,636,579 A | 1/1987 | Hanak et al. | |
| 4,713,492 A | 12/1987 | Hanak | |
| 4,727,932 A * | 3/1988 | Mahefkey | 165/41 |
| 4,747,567 A | 5/1988 | Johnson et al. | |
| 4,787,580 A * | 11/1988 | Ganssle | 244/172.6 |
| 5,235,788 A * | 8/1993 | Maimets | 52/108 |
| 5,296,044 A | 3/1994 | Harvey et al. | |
| 5,487,791 A | 1/1996 | Everman et al. | |
| 5,520,747 A * | 5/1996 | Marks | 136/245 |
| 5,720,452 A * | 2/1998 | Mutschler, Jr. | 244/172.7 |
| 5,785,280 A | 7/1998 | Baghdasarian | |
| 5,833,176 A | 11/1998 | Rubin et al. | |
| 5,857,648 A | 1/1999 | Dailey et al. | |
| 5,927,654 A * | 7/1999 | Foley et al. | 244/172.6 |
| 6,017,002 A | 1/2000 | Burke et al. | |
| 6,137,454 A * | 10/2000 | Peck | 343/912 |
| 6,228,441 B1 | 5/2001 | Suzuki et al. | |
| 6,343,442 B1 | 2/2002 | Marks | |
| 6,374,565 B1 * | 4/2002 | Warren | 52/653.2 |
| 6,437,232 B1 * | 8/2002 | Dailey et al. | 136/245 |
| 6,478,261 B2 | 11/2002 | Laraway et al. | |
| 6,547,190 B1 * | 4/2003 | Thompson et al. | 244/172.7 |
| 6,568,638 B1 * | 5/2003 | Capots | 244/159.4 |
| 6,581,883 B2 | 6/2003 | McGee et al. | |
| 6,609,683 B2 | 8/2003 | Bauer et al. | |
| 6,637,702 B1 * | 10/2003 | McCandless | 244/172.6 |
| 6,702,976 B2 | 3/2004 | Sokolowski | |
| 6,772,479 B2 | 8/2004 | Hinkley et al. | |
| 6,775,046 B2 | 8/2004 | Hill et al. | |
| 6,872,433 B2 * | 3/2005 | Seward et al. | 428/36.9 |
| 6,983,914 B2 | 1/2006 | Stribling et al. | |
| 7,806,370 B2 | 10/2010 | Beidleman et al. | |
| 8,061,660 B2 | 11/2011 | Beidleman et al. | |
| 8,066,227 B2 | 11/2011 | Keller et al. | |
| 8,109,472 B1 | 2/2012 | Keller et al. | |
| 2002/0096603 A1 | 7/2002 | Bauer et al. | |
| 2005/0178921 A1 | 8/2005 | Stribling et al. | |
| 2007/0262204 A1 | 11/2007 | Beidleman et al. | |
| 2011/0210209 A1 | 9/2011 | Taylor et al. | |
| 2012/0012154 A1 | 1/2012 | Keller et al. | |

OTHER PUBLICATIONS

International Search Report and Written Opinion of PCT/US2011/026437 mailed on Jun. 27, 2011, 10 pages.

International Search Report and Written Opinion of PCT/US2011/026745 mailed on May 10, 2011, 11 pages.

Spence, B., et al., "Mars Pathfinder Rover Egress Deployable Ramp Assembly," 30th Aerospace Mechanisms Symposium, NASA Langley Research Center, May 15-17, 1996, 16 pages.

* cited by examiner

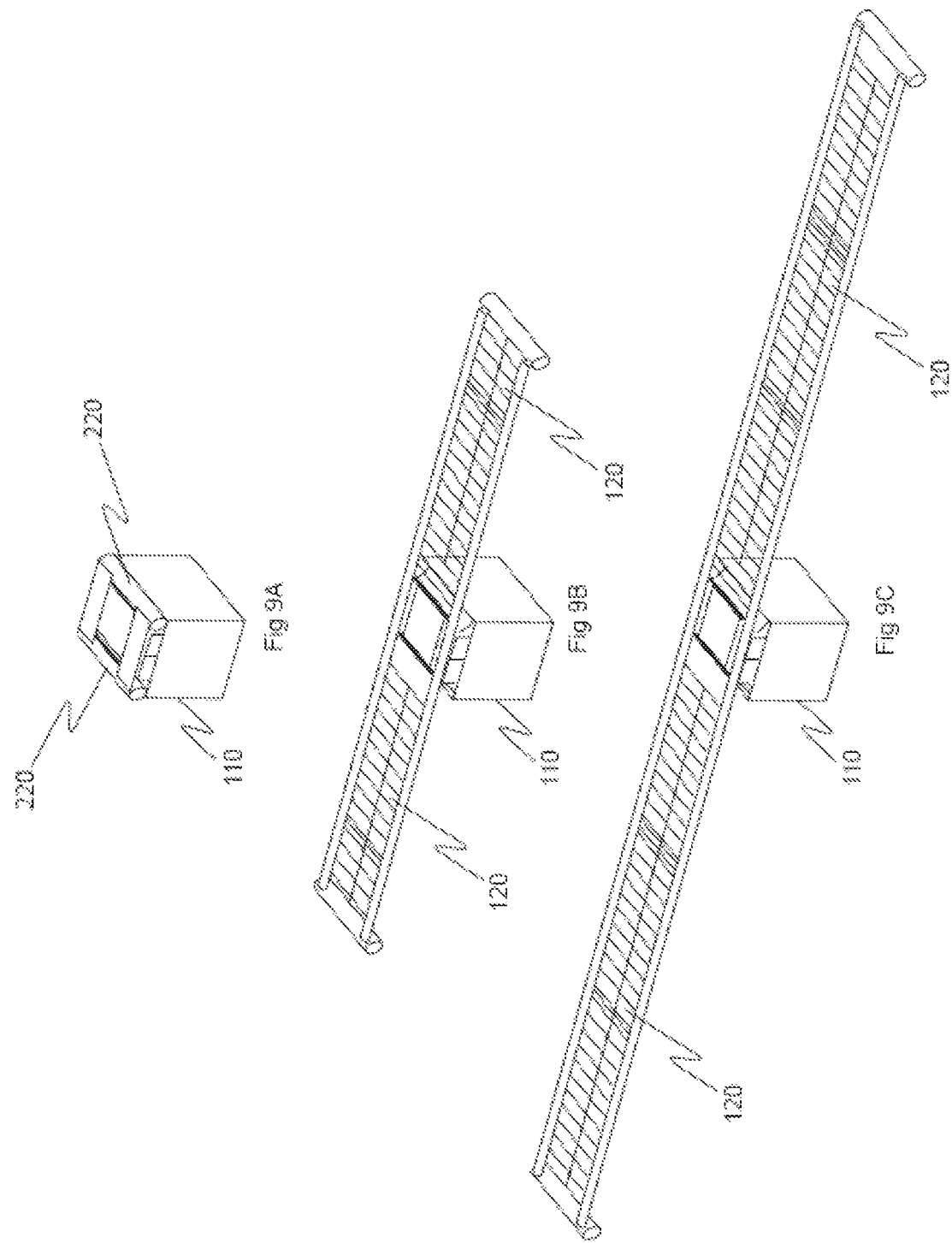

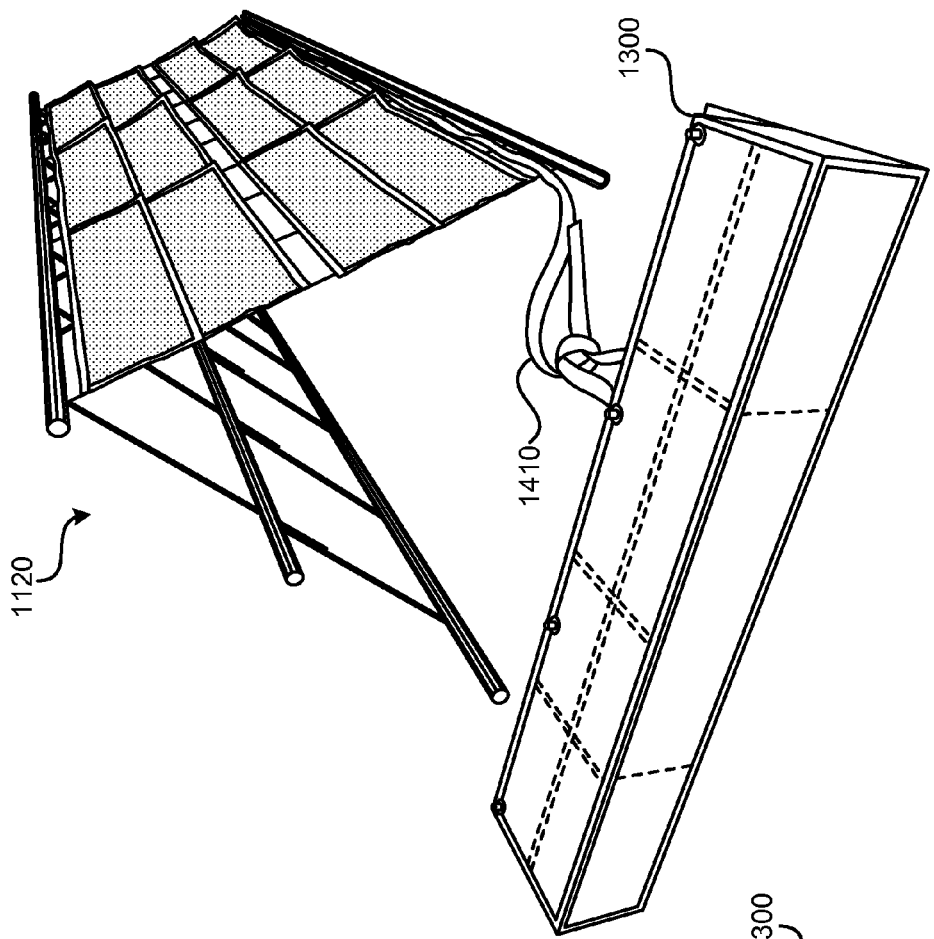
Fig. 14C
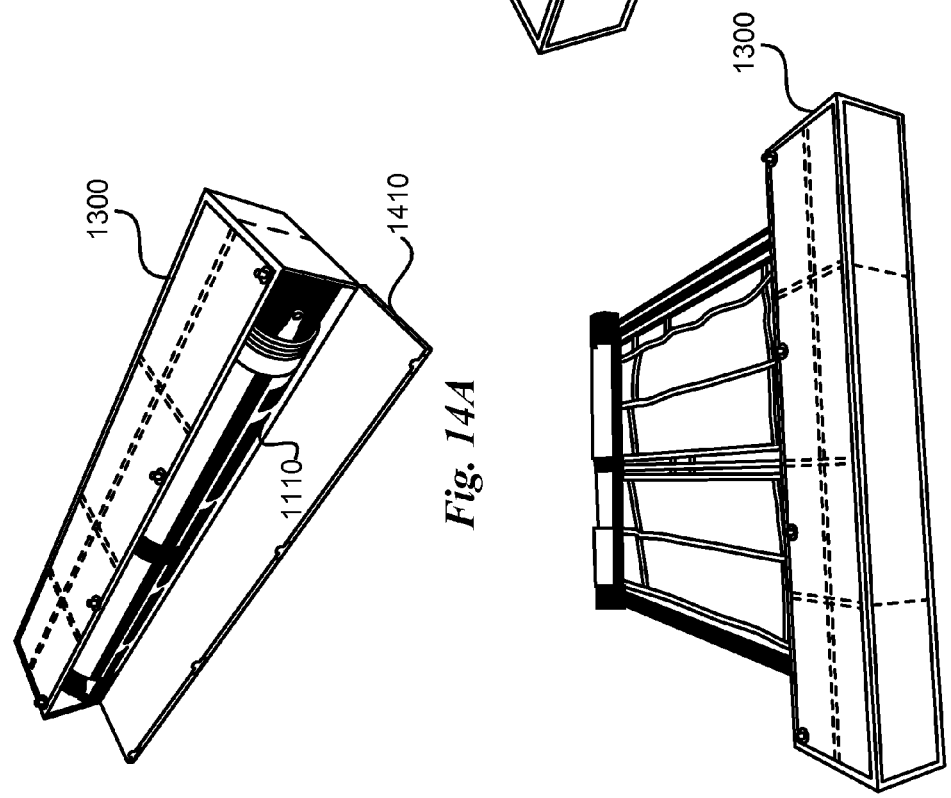
Fig. 14A
Fig. 14B

COLLAPSIBLE STRUCTURES

CROSS-REFERENCES TO RELATED APPLICATIONS

This application is a continuation-in-part and claims the benefit of co-pending, commonly assigned U.S. patent application Ser. No. 13/014,299, filed Jan. 26, 2011, entitled "Collapsible Structures With Adjustable Forms," which is a continuation of U.S. patent application Ser. No. 12/873,615, filed Sep. 1, 2010, entitled "Large-Scale Deployable Solar Array," and claims the benefit of U.S. Provisional Application No. 61/310,205, filed on Mar. 3, 2010, entitled "Collapsible Structures," which is a continuation of U.S. patent application Ser. No. 11/695,163, filed Apr. 2, 2007, entitled "Large-Scale Deployable Solar Array," which is a non-provisional of and claims the benefit of co-pending, commonly assigned, U.S. Provisional Application No. 60/788,449, filed on Mar. 31, 2006, entitled "Large-Scale Deployable Solar Array," the entirety of each of these applications are herein incorporated by reference for all purposes.

STATEMENT AS TO RIGHTS TO INVENTIONS MADE UNDER FEDERALLY SPONSORED RESEARCH AND DEVELOPMENT

The U.S. Government may have rights in this invention pursuant to Contract No. FA9453-04-M-0302 and N00014-10-M-0213.

BACKGROUND OF THE INVENTION

This invention relates to deployable structures and, in particular, to deployable structures having adjustable deployed configurations.

Deployable structures, such as litters, bridges, shelters, support structures, and solar arrays, having rigid structures can be effectively packaged and deployed. When deployed, the shape of such structures can further be maintained. These structures can include flexible members, but the flexible members are typically deployed using a separate boom or booms.

For example, thin photovoltaic arrays have been used for the original solar arrays on the Hubble Space Telescope and for the primary solar arrays on the International Space Station (ISS). The Hubble arrays were packaged in a roll and deployed with booms mounted on either side of the roll that pull the roll out into a sheet as they extend. The ISS arrays were packaged into a stack by folding and pleating a long, thin sheet of material that is deployed with a single boom mounted underneath the array that pulls the stack into a sheet as it extends.

SUMMARY OF THE INVENTION

Structures and methods are disclosed regarding deployable structures with expandable longerons adjustably coupled with supporting structures such that an angle between the supporting structures can be adjusted. Such structures can include and/or be used for solar arrays, bridges, support structures, and more. These structures can be easily transported to a new location and deployed from the stowed configuration into a larger functional structure. In some embodiments these structures can use one or more longerons that can have two resting states: deployed and rolled.

According to one embodiment, a deployable (or collapsible) structure can comprise a longeron having a slit along a longitudinal length of the longeron. A first supporting structure can be coupled with the longeron at a first location of the longeron, and a second supporting structure can be adjustably coupled with the longeron at a second location of the longeron such that the second supporting structure is angled with respect to the first supporting structure when the longeron is in the deployed state. Furthermore, an adjustment of the angle between the first and second supporting structures causes deformation of at least one of a cross-sectional profile of the longeron, and the second supporting structure. The longeron, the first supporting structure, and the second supporting structure can be stowed as a roll comprising the longeron, the first supporting structure, and the second supporting structure. The roll can be rolled along a longitudinal length of longeron.

This embodiment can include numerous additional features. For example, one or more solar cells can be coupled with the first supporting structure, the second supporting structure, or both. Optionally, the roll can comprise the one or more solar cells. Additionally or alternatively, the deployable structure further can comprise a second longeron coupled with the first supporting structure. Optionally, the first supporting structure can comprise a plurality of connecting elements coupled with the first and second longerons. Also optionally, the first supporting structure further can comprise a sheet of material coupled with one or more of the plurality of connecting elements. Finally, the first supporting structure, the second supporting structure, or both, can be coupled with the longeron at a plurality of positions along the longitudinal length of the longeron.

In a second embodiment, a deployable structure can comprise a plurality of longerons. Each longeron can include a slit along the longitudinal length of the longeron, a material with a curved cross-sectional profile when the longeron is in a deployed state, and a stowed state, where the longeron, being rolled along a longitudinal length of the longeron, comprises a roll. The deployable structure can also include a first supporting structure coupled with a first longeron and a second longeron, where the first supporting structure is coupled with the first longeron at a first location of the first longeron. A second supporting structure can be adjustably coupled with the first longeron at a second location of the first longeron such that the second supporting structure is angled with respect to the first supporting structure when the first longeron is in the deployed state, and an adjustment of the angle between the first and second supporting structures causes deformation of at least one of a cross-sectional profile of the longeron, and the second supporting structure.

This second embodiment also can include various additional features. For example, the curved cross-sectional profile of some or all longerons of the plurality of longerons can be semi-circular. Optionally, the first and second longerons, when stowed, can comprise a singular roll. Moreover, the deployable structure can comprise a solar panel, where, in some configurations, solar cells can be coupled with the first supporting structure between the first longeron and the second longeron.

A third embodiment includes a method of manufacturing a deployable structure. In this embodiment, the method comprises providing a longeron having a slit along the longitudinal length of the longeron, a stowed state, where the longeron, being rolled along a longitudinal length of the longeron, comprises a roll, and coupling a supporting structure with the longeron at a location of the longeron. The coupling can be such that the supporting structure is angled with respect to the longeron when the longeron is in the deployed state, and an adjustment of the angle between the supporting structure and the longeron causes deformation of at least one of a cross-sectional profile of the longeron, and the supporting structure.

This third embodiment can include various additional features. Such features include coupling one or more solar cells with the longeron, the supporting structure, or both. Additionally or alternatively, the supporting structure can be coupled such that longeron and the supporting structure comprise a singular roll when the longeron is in the stowed state. The method also can include coupling a second supporting structure such that longeron and the second supporting structure comprise a singular roll when the longeron is in the stowed state. Optionally, the longeron can comprise a first longeron, where the method further includes coupling a second longeron with the supporting structure. Also, the supporting structure can comprise a plurality of connecting elements coupled with the first and second longerons, and/or the method can include coupling the supporting structure with the longeron at a plurality of positions along the longitudinal length of the longeron. Finally, the deformation of the supporting structure can comprise a bending of a hinge of the supporting structure.

BRIEF DESCRIPTION OF THE DRAWINGS

FIGS. 9A-C show a bi-directional deployment of solar array structures according to one embodiment of the invention.

FIGS. 14A-14C are illustrations of how the stowage and transport box of FIG. 13 can be used when a collapsible terrestrial solar panel is in stowed and deployed states.

DETAILED DESCRIPTION OF THE INVENTION

Figure 1:
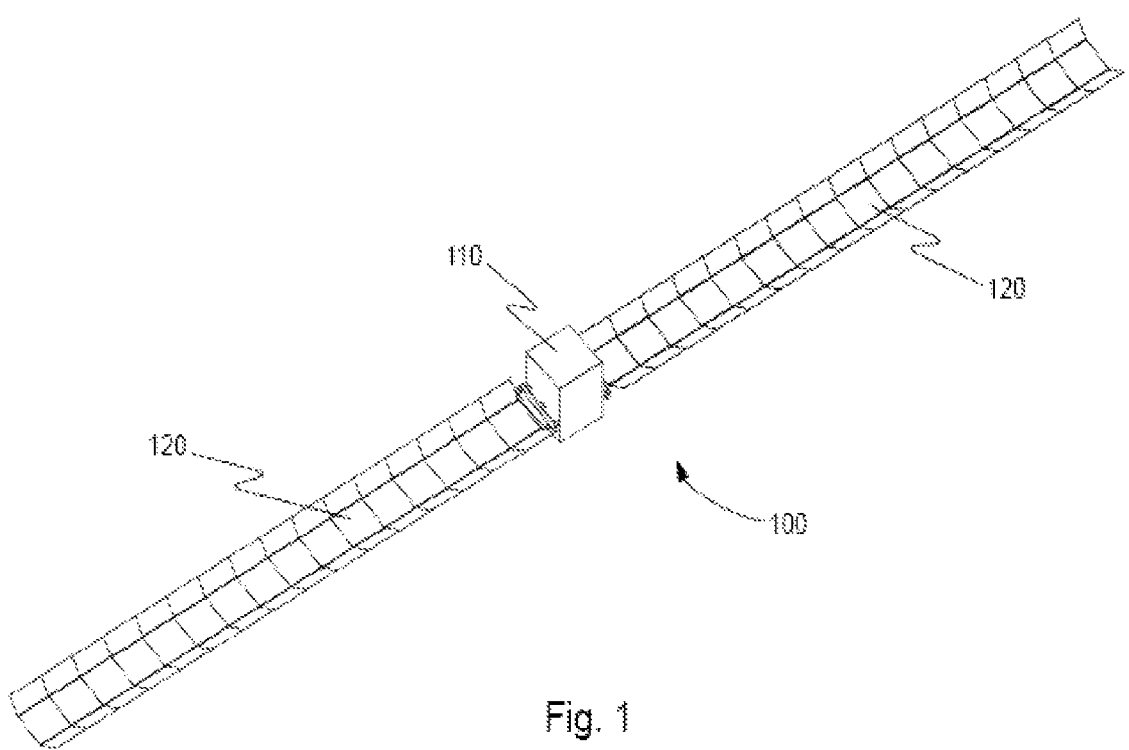
FIG. 1 shows a two solar array structures coupled with a spacecraft according to one embodiment of the invention.

Embodiments of the present invention include collapsible structures constructed with one or more longerons, including slit-tube longerons. These structures can include, for example, load bearing structures, beams, support structures, litters, bridges, solar arrays, buildings, tents, etc. In some embodiments, collapsible structures can be rolled or stowed in a configuration with small volume and deployed in configuration with a larger volume, depending on the structures. Some collapsible structures can include multiple slit-tube longerons in parallel and/or perpendicular configurations. In some embodiments sheet material can be coupled with the slit-tube longerons and expand between the spaces between the slit-tube longerons. In some embodiments structural cross members can span the spaces between the slit-tube longerons.

As discussed herein, longerons can include any elongated tubular material. Such longerons can have a cross-sectional profile comprising all or a portion of a circle, ellipse, curved, or polygonal shape. Moreover, a slit-tube longeron can include a slit along the longitudinal length of the slit-tube longeron. The slit can include a straight slit, curved, and/or jagged slit along the longitudinal length of the slit-tube longeron. In some embodiments discussed below, the slit can allow to portions of the longeron to overlap or have a wide slit; the latter comprising fractional tube longeron such that the a cross section of the longeron comprises an open shape.

Slit-tube longerons can have two configurations. A first configuration can include a rolled or stowed configuration. A second configuration can include an expanded or deployed configuration. In the rolled configuration the slit-tube longeron can flatten laterally and be rolled longitudinally. In the deployed configuration the slit-tube longeron can be extended longitudinally and rolled or curved laterally. The slit-tube longeron can be stable in both the first and second configurations.

Other slit-tube longerons can have a single rest state. That is, the slit-tube longeron can have a single stable state. For example, the deployed state can be stable and the rolled state unstable. Thus, in the rolled state the slit-tube longeron must be constrained in order to maintain the slit tube longeron in the rolled state. Once the constraints are released, the slit tube longeron will extend into the deployed state.

In some embodiments, a slit-tube longeron can have multiple rest states. Such slit-tube longerons can be in a rest state at some point between the rolled and extended shape. Moreover, various other types of resting states can exist.

One application in which collapsible structures constructed with one or more such extendible longerons can be used is spacecraft. Spacecraft are limited in power, stowed volume, and mass available to meet requirements. These parameters are traded against each other as well as overall cost in spacecraft design. More efficient solar array packaging and mass would allow spacecraft to have more power on orbit or the same power for less mass and stowed volume. Additional power could be used, for example, to increase services for radio frequency (RF) communications, provide power for electric propulsion, or increase the science capability of exploratory spacecraft. Similarly, additional stowed volume could be used, for example, for additional antennas for RF communications or larger science instruments. Also, a simpler solar array design could be fabricated and tested for a lower cost. Because of the extremely constrained nature of spacecraft design and because nearly all spacecraft require solar arrays for power, solar arrays with greater mass and volume efficiency could be used to increase the capability or decrease the cost of a spacecraft for any mission.

For purposes of illustration only, embodiments of invention involving spacecraft discussed herein are described herein in regard to a solar array subsystem which is deployed from an on-orbit spacecraft in zero gravity. Those skilled in the art will recognize that the embodiments of the invention may be applied to other applications.

Turning first to FIG. 1, a spacecraft 110 is shown with two deployed solar array structures 120 according to one embodiment of the invention. The solar array structures may be of any dimension. For example, each solar array structure 120 may be 5 feet across and 20 feet long (measured from the satellite to the end of the solar array). As another example, each solar array structure may be 20 feet wide and 50 feet long. As yet another example, each solar array structure may be 40 feet wide and 112 feet long. The size of the solar array may depend on the needs of the specific application, based in part, for example, on power needs, weight, and cost, but is not limited by the embodiments of the invention.

Figure 2:
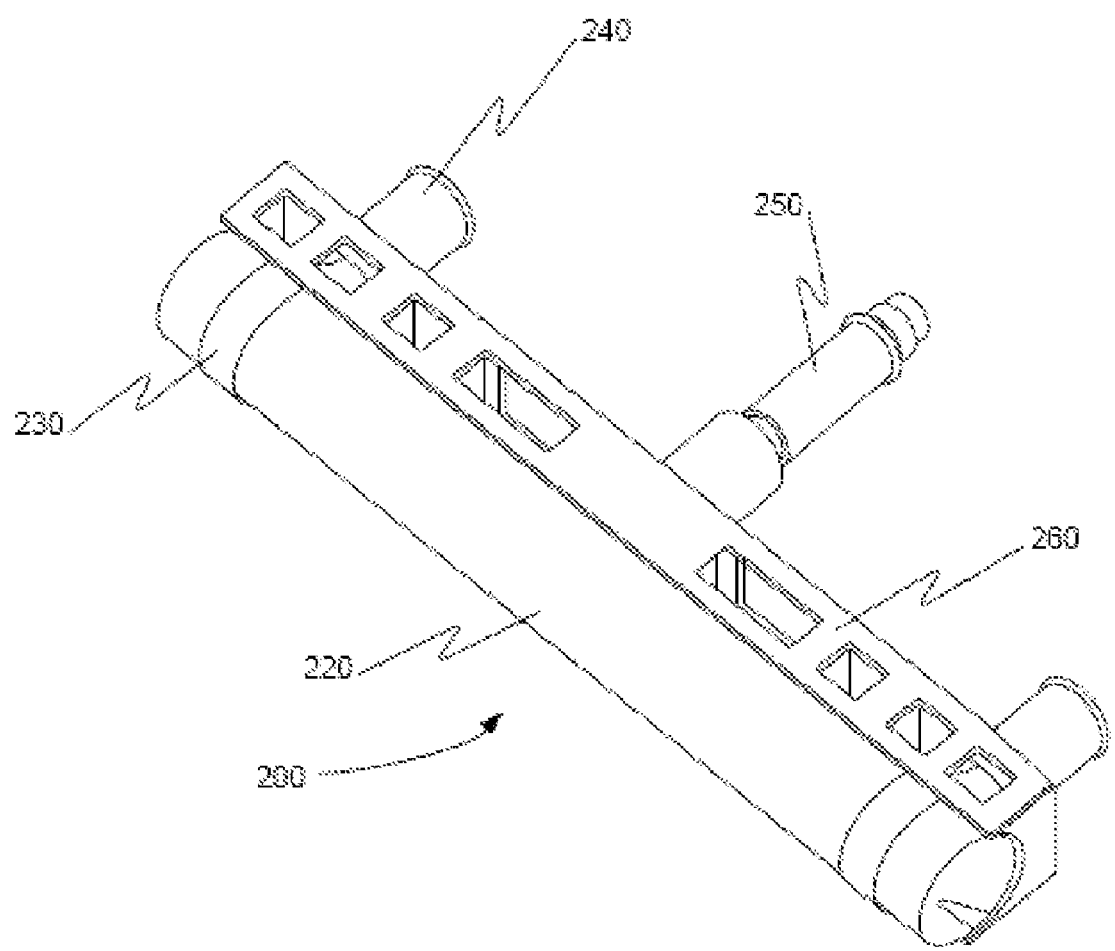
FIG. 2 shows a solar array structure in the rolled position couple and stowed with a yoke according to one embodiment of the invention.

FIG. 2 shows an undeployed, rolled solar array structure 220 attached to a yoke 260 according to one embodiment of the invention. The yoke 260 may be attached to a gimbal 250. The gimbal 250 may provide rotation of the solar array structure 120 in multiple dimensions. For example, the gimbal 250 may allow the structure, and hence the solar array structure 120 in this case, to be pointed toward the sun by the spacecraft 110 and its control system. Outboard from the gimbal 250 mount is a yoke 260. The yoke 260 may provide a load path between the solar array structure 120 and the gimbal 250 mount. It also provides a mechanism for supporting the rolled solar array, for example, during launch, deployment and while stowed in a rolled position.

Figure 3:
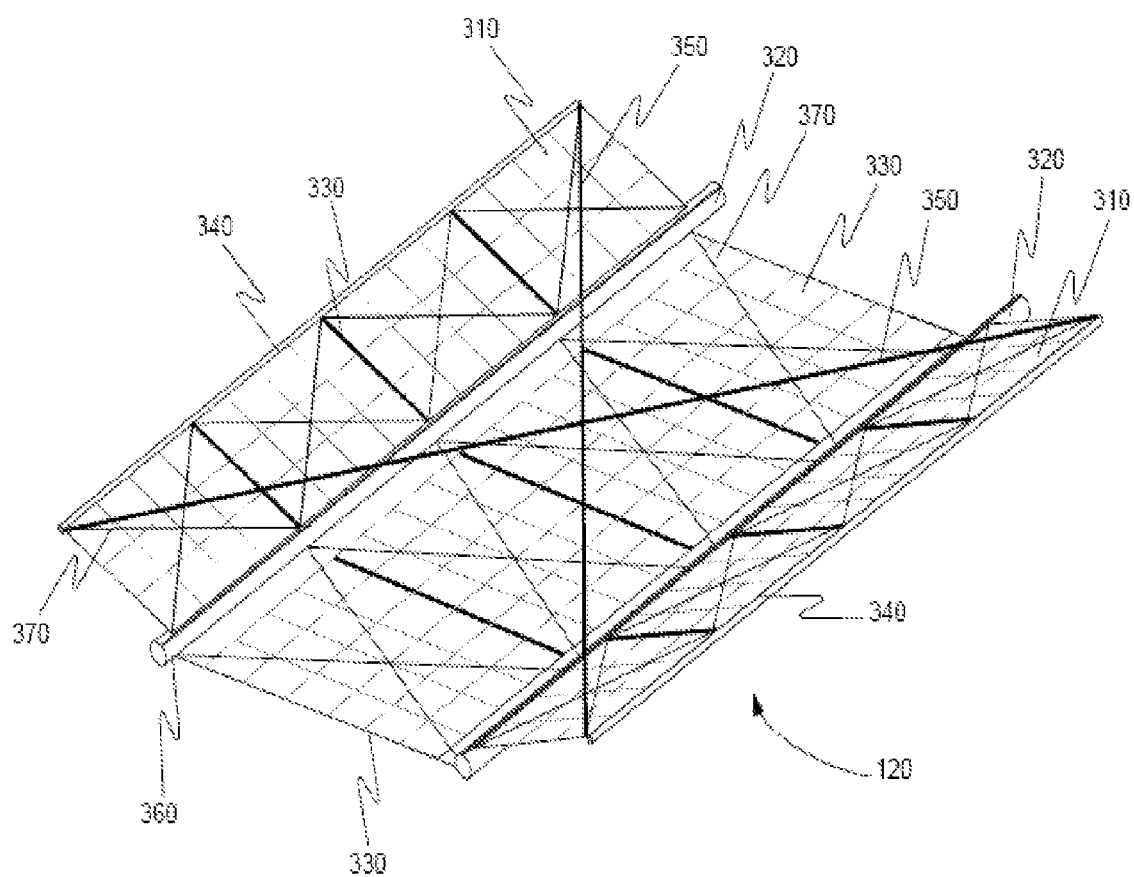
FIG. 3 shows a deployed solar array structure according to one embodiment of the invention.

FIG. 3 shows a solar array structure 120 in more detail according to one embodiment of the invention. This solar array has a central solar panel 300 and two wing solar panels 310. In this embodiment, the wing solar panels 310 are deployed to an angle not coplanar with the central solar panel 300. The wing solar panels 310 may alternatively be deployed coplanar with the central solar panel 300. Other embodiments of the invention may include a single central solar panel 300 without wing solar panels 310. Moreover, another embodiment may include a single central solar panel 300 and a single wing solar panel 310.

The solar array structure 120 may include two primary longerons 320, lateral battens 330, and wing edge longerons 340. The primary longerons 320 and the lateral battens 330 form structural panels. Other longerons and battens may be included for structural stability. Moreover, battens and longerons are not required. The central solar panel 300 and the wing solar panels 310 may be photovoltaic blankets. These photovoltaic blankets may include photovoltaic cells, such as, for example, silicon photovoltaic cells. The photovoltaic blankets may be, for example, thin film photovoltaics on a structural substrate or rigid cell photovoltaics on a mesh fabric. The photovoltaic cells may be grouped into panels. The photovoltaic cells may also be thin film photovoltaic cells. For example, the photovoltaic cells may include an amorphous silicon alloy or copper indium gallium deselinide cells deposited on a thin metallic or polyimide substrate.

Photovoltaics may be mounted on blanket assemblies and attached to a frame at junction points 360 along one of the primary longerons 320. Cable-style diagonals 370 may be included to stiffen both the central and wing solar panels. Wing diagonals 350 connecting and supporting the two wing solar arrays may also be included. The diagonals provide shear and torsional rigidity when the structure is fully deployed.

Figure 4:
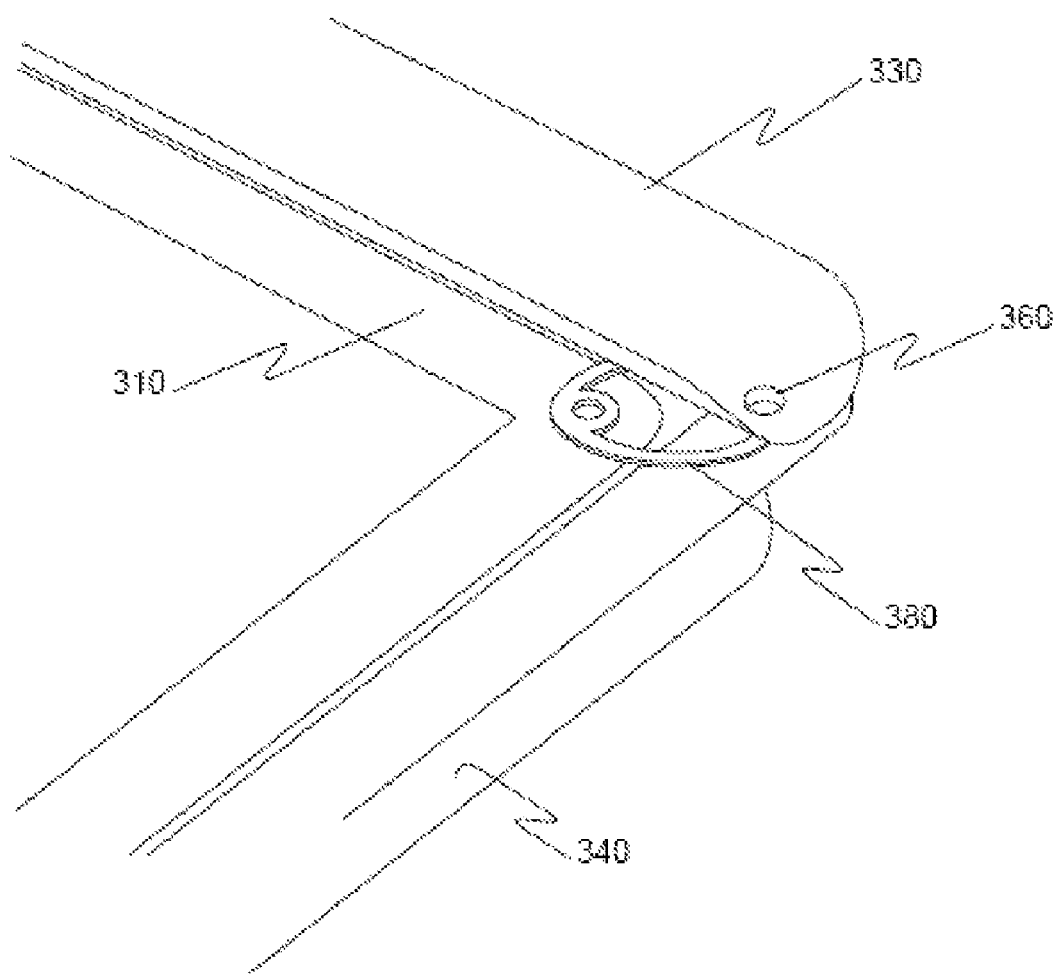
FIG. 4 shows a clip used to attach a solar blanket to a support structure according to one embodiment of the invention.

According to another embodiment of the invention, photovoltaic blankets may be attached to the frame junctions with clips 380 as shown in FIG. 4. The clips 380 may be attached at the junction point 360 of an wing edge longeron 340 and a batten 330. The clips 380 may allow for easy installation and removal of the photovoltaic blankets. They may include a spring to provide the preload necessary to tension the blanket inside of the frame sections. The soft spring also decreases the change in blanket tension due to manufacturing tolerances and any on-orbit distortions. The clips 380 with springs may also be set to decrease or eliminate tension being applied to the photovoltaic blanket. The photovoltaic blankets may be attached to the frame using other devices, such as for example, grommets, elastic cords, etc.

Figure 5:
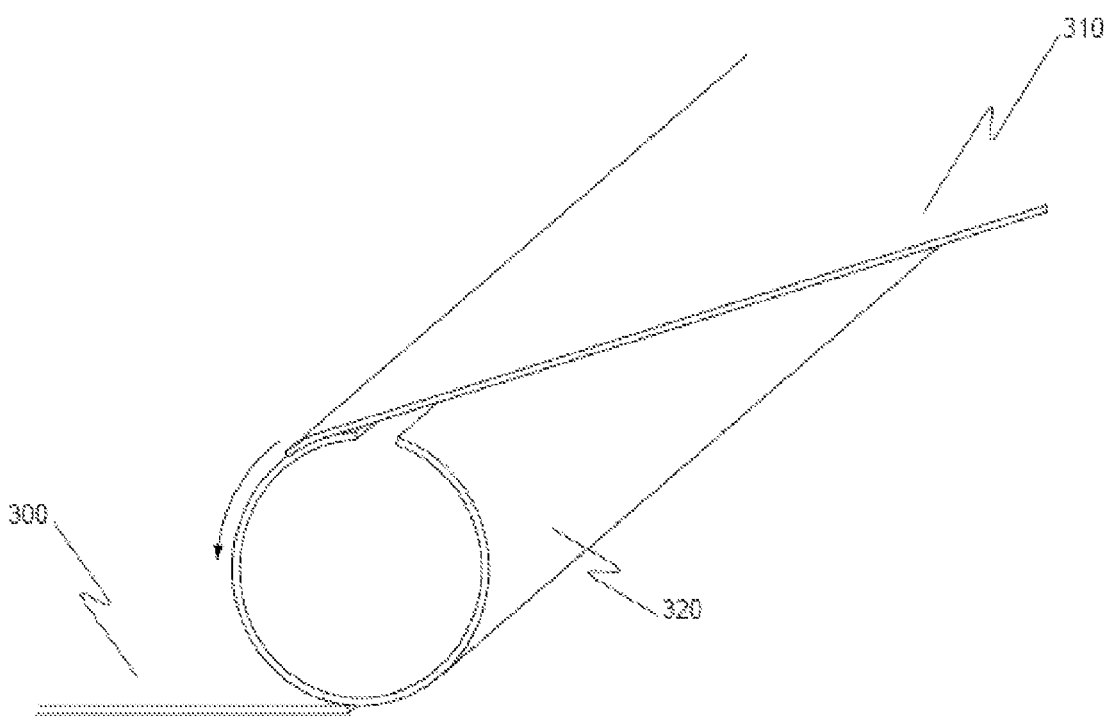
FIG. 5 shows a close up of a slit-tube longeron coupled with a central and wing solar panel according to one embodiment of the invention.

FIG. 5 shows a close up of a slit-tube primary longeron 320 coupled with a wing solar panel 310 and a central solar panel 300. The longerons are constructed such that they may be flattened and rolled for stowage while regaining their original cross-section during deployment. The primary longeron 320 may be a long tube with one or more slits 25. The slits may allow the tube to be flattened and rolled. The primary longeron 320 may be constructed from any elastic material or memory material, such as, for example, a metal, a composite, or a polymer. Many shape memory materials are known in the art. For example, the primary longerons 320 may comprise copper-zinc-aluminum, copper-aluminum-nickel, or nickel-titanium alloys. In another embodiment of the invention, the primary longerons 320 may be constructed from an elastic memory composite (EMC) material, such as, for example, TEMBO®, which is commercially available from Composite Technology Development, Inc. Some materials can be expanded and/or deployed when exposed to heat. Thus, deployable structures, such as solar panels employing longerons 320, can include heating elements to enable the structure's deployment. For added flexural properties the primary longerons 320 may have some curvature much like a carpenter's tape or may be stiffened by another mechanism such as a sandwich panel cross section with collapsed thickness for stowage.

Figure 6:
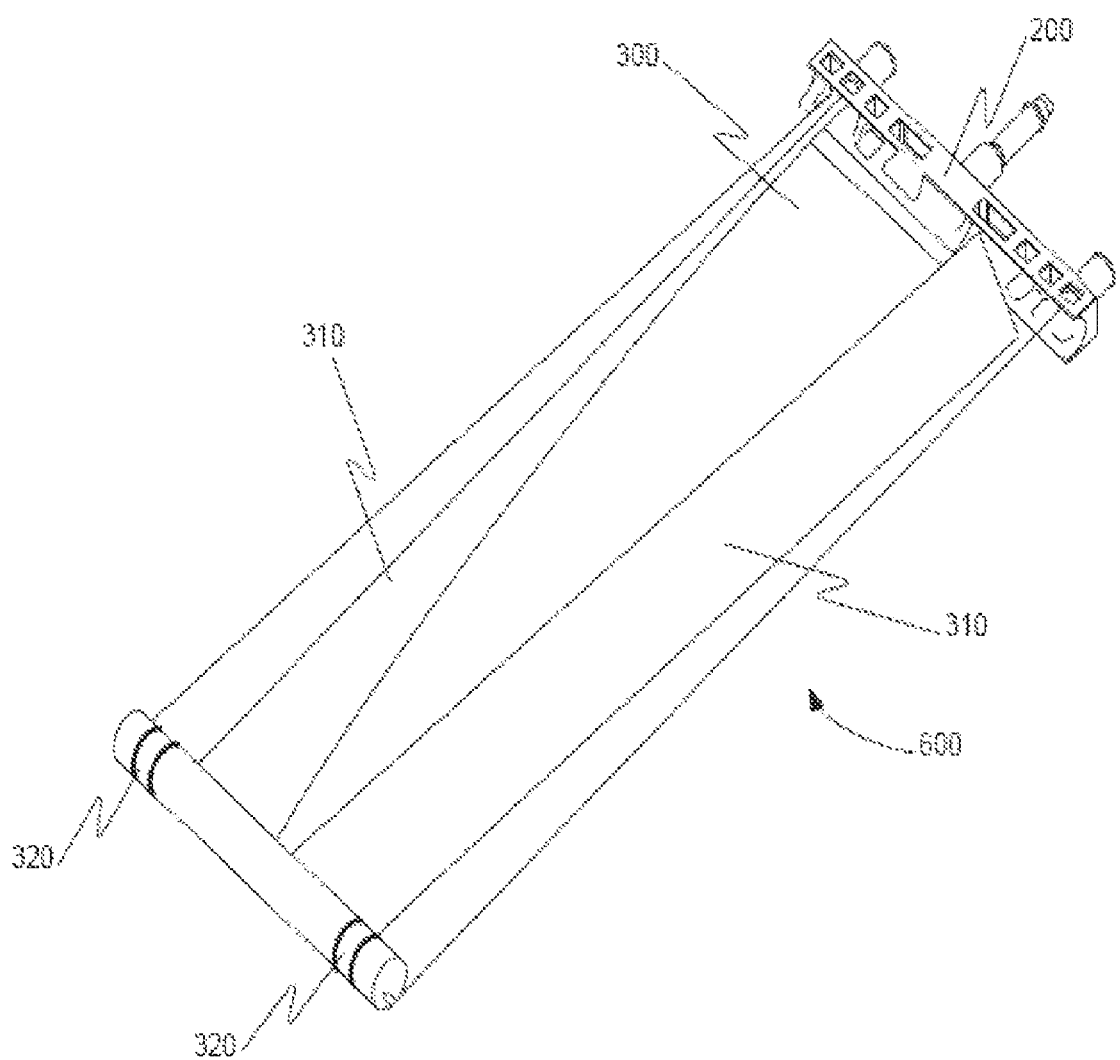
FIG. 6 shows a solar array structure being rolled according to one embodiment of the invention.

The primary longeron 320 may also act as wing hinge for the wing panels 310. The wing solar panels 310 may be folded onto the central solar panel 300 while the primary longeron 320 is flattened. This puts the three three-panel assembly (the two wing solar panels 310 and the central solar panel 300) into a single plane configuration which may then be rolled into a cylinder back to the yoke 260, as shown in FIG. 6. The rolled up array 220 may then be secured to the yoke 260 with a clamp band device 230 as shown in FIG. 2. Other mechanisms may be used to secure the rolled up array 220.

Figure 7A:
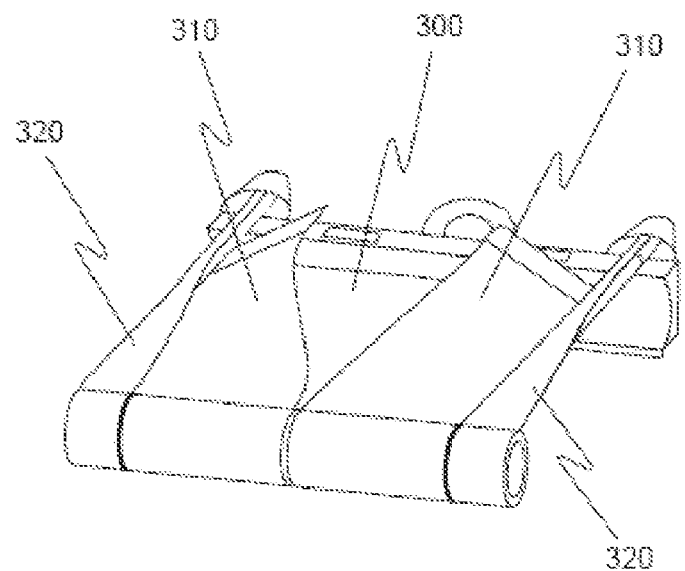
FIGS. 7A and 7B show a back-rolled and front-rolled solar array structure according other embodiments of the invention.
Figure 7B:
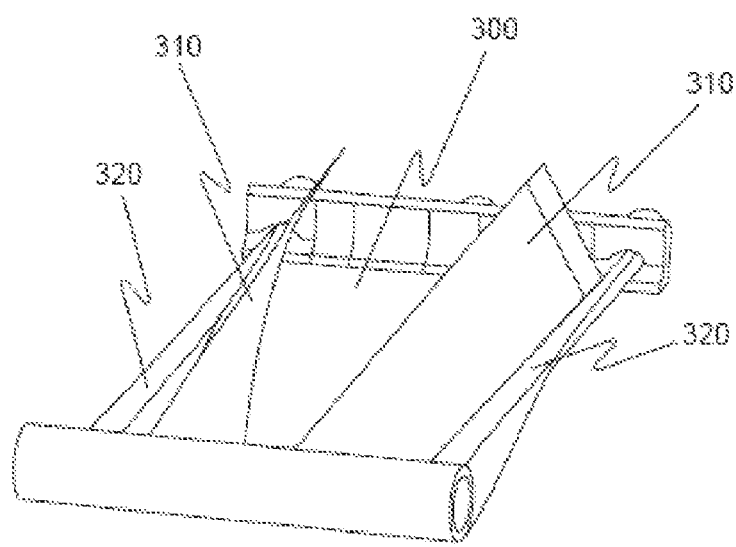

The solar arrays 300, 310 may be back-rolled as shown in FIG. 7A or front rolled as shown in FIG. 7B according to other embodiments of the invention. Back rolling occurs when the roll is above the plane of the deployed array. Front rolling occurs when the roll is below the plane of the deployed array. Moreover, the primary longerons 320 are exposed on the outside of the roll when back rolled and within the roll when front rolled. Reversing the roll direction may also change the attachment configuration of the wings to the rolled longeron.

The solar array structure 102 may be deployed by releasing the clamp band 230. The clamp band 230 provides initial kick-off force and pulls the rolled array away from the yoke 260. Additionally the clamp band 230 may provide supplementary root stiffness to the primary longeron. The deploying force is primarily derived from the strain energy stored in the rolled primary longeron; however, additional strain energy may also stored in the other frame elements, which are flattened and rolled into the stowed configuration. While the primary longeron is unrolling, the wings may deploy due to their integral nature with the primary longerons. The wings are deployed as the flattened primary longeron is restored to its preformed shape. The deploying wing solar panels 310 may provide stability during deployment. The wing solar panels 310 may also decrease the ability for the rolled array to unfurl and then roll back on itself like a yo-yo. The wing solar panels 310 may also provide some depth to the structure, which in turn may control the deployment profile. This coordinated deployment also dissipates the stored energy into multiple kinetic energy paths (left wing, right wing, unfurling tip mass). This decreases the amount of force and moment that must be reacted and controlled by the host spacecraft when the structure reaches its final deployed position. When deployment is complete, the wing to wing diagonal members will be slightly tensioned through residual strain energy in the primary longerons.

Figure 8:
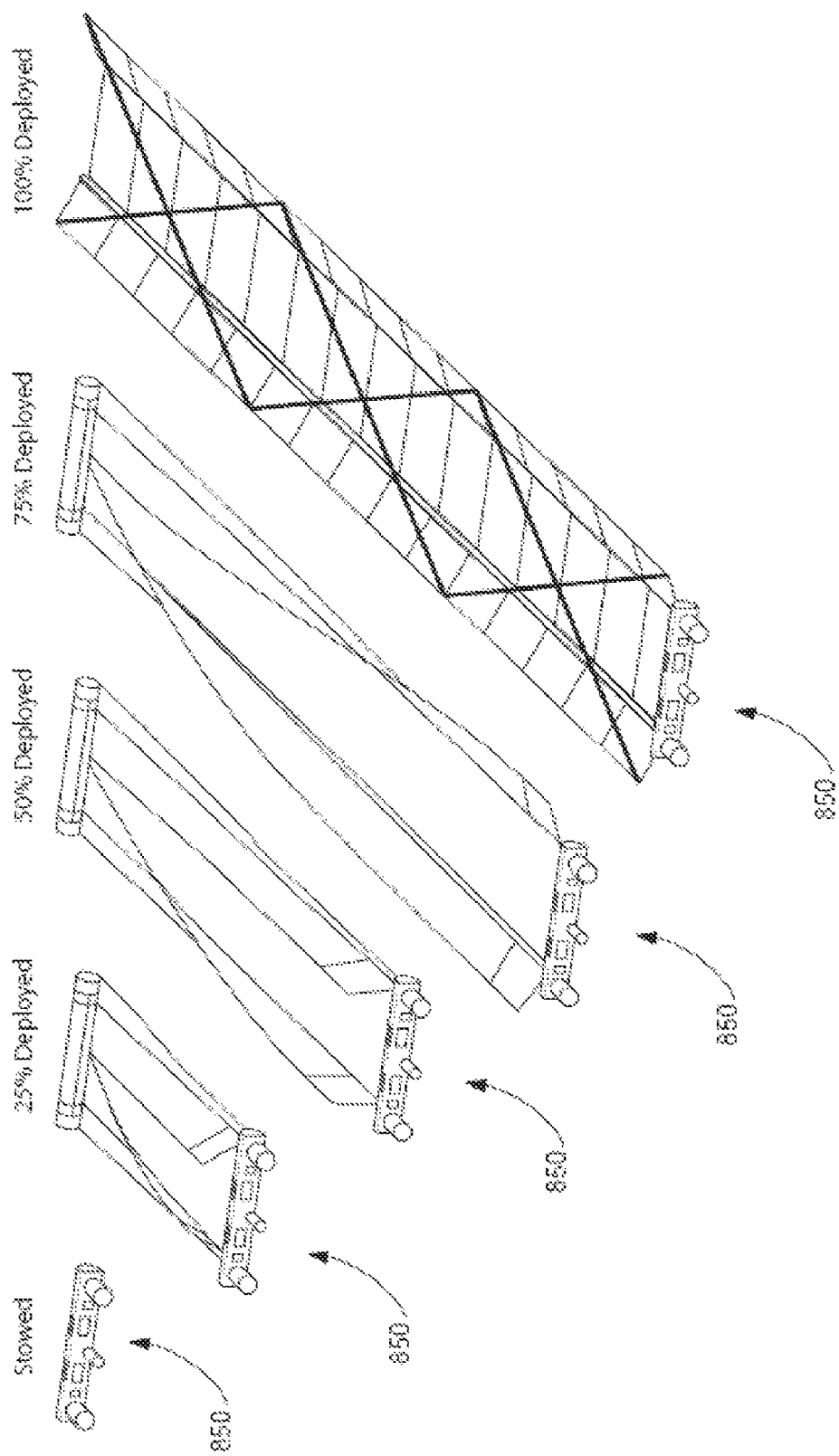
FIG. 8 shows the progression of a solar array structure from being stowed to fully deployed according to one embodiment of the invention.

FIG. 8 shows a progression as the structure is deployed according to one embodiment of the invention. The rolled array is stowed with the yoke 810. The figure then shows the solar array structure deployed over various phases from stowed 810 to 25% deployed to 50% deployed to 75% deployed to 100% deployed. The figure also shows how the wings are deployed during each stage of deployment.

Barreling and rate of deployment are controlled through the primary longeron 320. The longeron may include a bistable elastic design and/or include a shape memory material. The shape memory material may have integral heaters that are electronically controlled. The longerons may also be heated by solar energy. In such a case, the array may be back rolled so that the primary longerons 320 may be exposed to the sun when the array is rolled. Solar energy may then provide automatic deployment control because only the outside of the rolled longeron would be heated. The rate of unrolling would be limited because of the time required to heat the material to deployment temperature as it reaches the outside of the roll. Additional control could be added by using a spooled cable (not shown) attached to the tip of the primary longeron. The rate of cable release is controlled by a drag or braking mechanism mounted on the yoke 260.

In order for EMC material to regain its previous structure, both packaging and deployment may need to be accomplished above the materials glass transition temperature. In one embodiment, surface-bonded heaters may be used for packaging and deployment control of the slit-tube longerons. In another embodiment, solar energy may be used to deploy the solar array structures 120. Accordingly, the stowed and rolled structure may be turned toward the sun in such a way that the primary longerons 320 are heated. The heat causes the longerons to deploy by regaining a previously established shape.

FIGS. 9A-9C show a spacecraft 110 with bi-directional deployed solar array structures according to another embodiment of the invention. A space craft may have two rolled and stowed solar array structures 120 as shown in FIG. 9A. The two rolled and stowed solar array structures may begin deployment, as shown in FIG. 9B. FIG. 9C shows the two solar array structures 120 fully deployed in opposite directions. The solar array structures do not include wing solar panels.

Figure 10A:
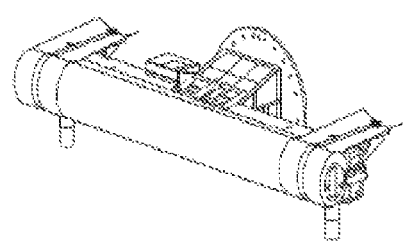
FIGS. 10A and 10B show another embodiment of a stowed and deployed solar array structure.
Figure 10B:
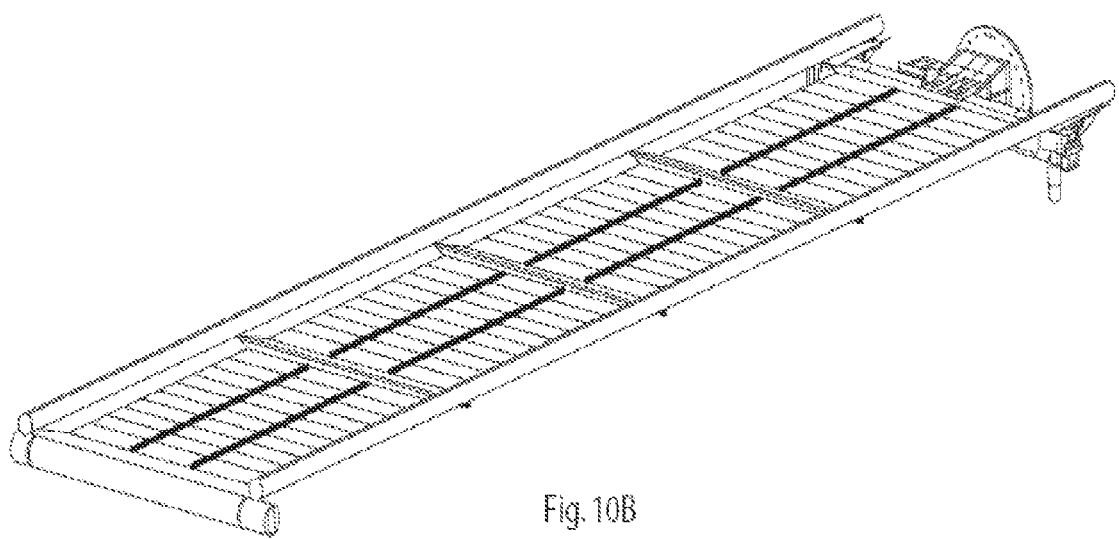

FIGS. 10A and 10B show a stowed and deployed solar array structure according to another embodiment of the invention. The embodiment shown in this figure shows a solar array structure coupled with a different yoke. The yoke may be adapted to rotate and/or position the solar array structure in a number of different positions. This solar array structure also includes only a central solar panel couple with two slit-tube longerons.

Although the collapsible structures constructed with one or more such extendible longerons described herein have applications in space-bound solar panel arrays as described above, other embodiments may be used for a wide variety of applications. Such applications can include, for example, load bearing structures, beams, support structures, litters, bridges, solar arrays, buildings, tents, etc.

Figure 11A:
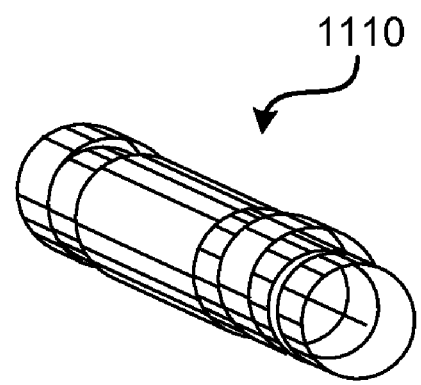
FIGS. 11A-11D show an embodiment of a collapsible terrestrial solar panel.
Figure 11B:
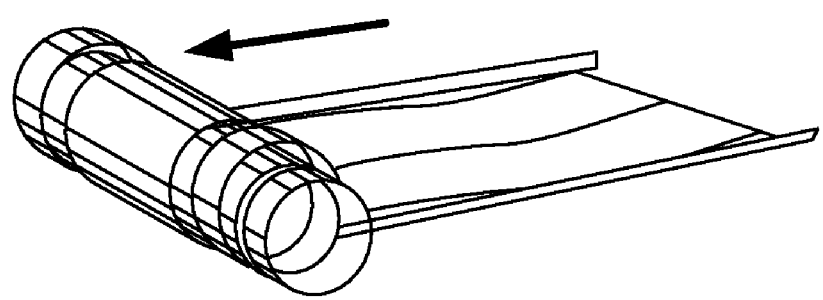
Figure 11C:
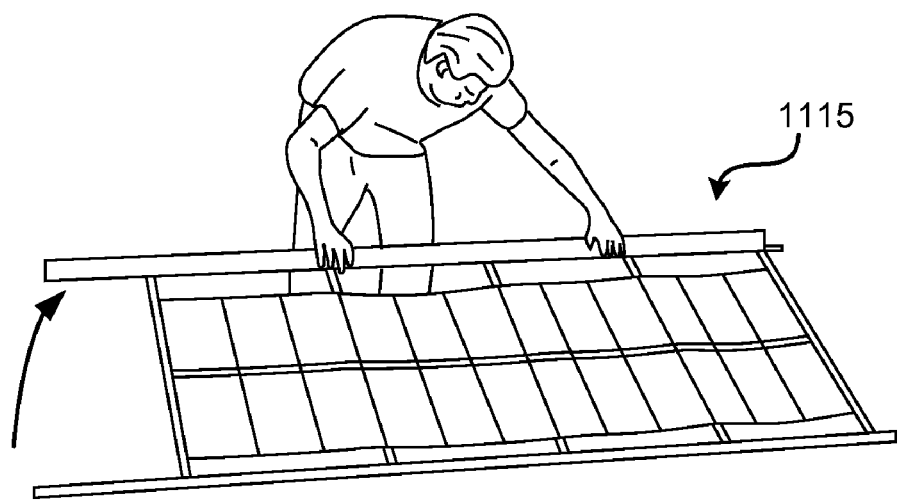
Figure 11D:
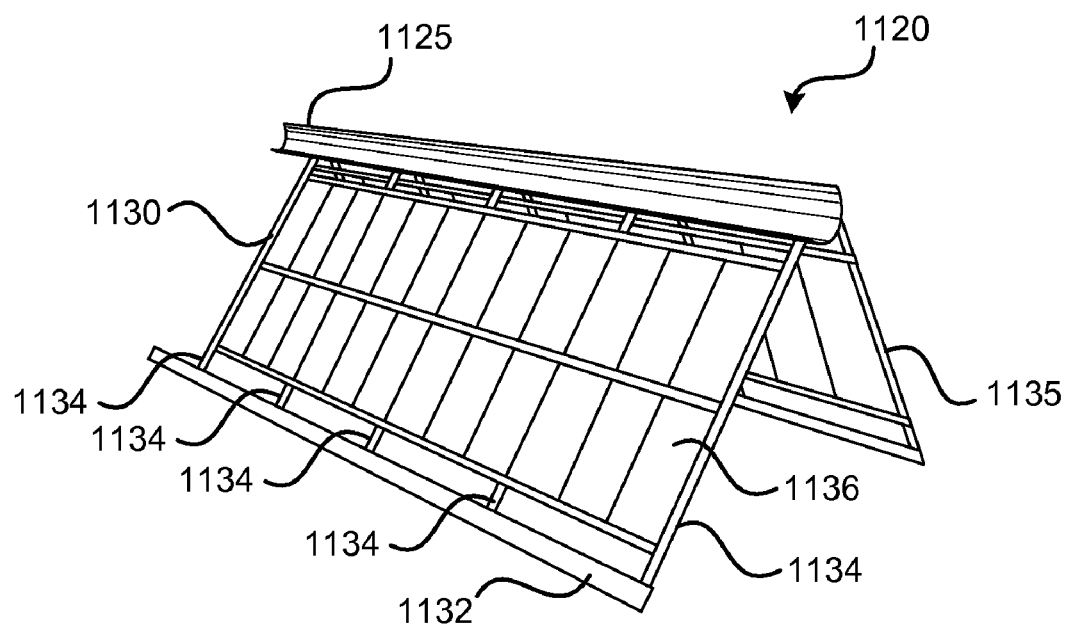

FIGS. 11A-11D show an embodiment of a collapsible terrestrial solar panel. FIG. 11A illustrates how the collapsible terrestrial solar panel can be stowed as a roll 1110. FIGS. 11B and 11C illustrate successive steps that can be taken to deploy the collapsible terrestrial solar panel. FIG. 11B illustrates unrolling the roll 1110 and FIG. 11C illustrates lifting the unrolled unit 1115 to allow the front and back support structures to carry the load of the collapsible terrestrial solar panel. Finally, FIG. 11D illustrates the collapsible terrestrial solar panel in a deployed state 1120. Once deployed, the solar panel can be stowed by reversing the steps shown in FIGS. 11B and 11C. Thus, the longerons, support structures, and/or solar cells can be flattened and rolled together to form a singular roll 1110, which facilitates portability.

The solar panel can include a first longeron 1125 coupled with a front support structure 1130 and a back support structure 1135. The front support structure 1130 can include a second longeron 1132 and comprise a plurality of connecting elements 1134 connecting the first and second longerons. The front support structure 1130 and/or back support structure 1135 can be further coupled with a sheet of material 1136, which can comprise and/or be coupled with solar cells. As illustrated in FIGS. 11A-11D, certain embodiments contemplate a solar array that is stowed as a roll 1110 with the rest of the components. Rigid and/or flexible solar cells can be used. Where a plurality of rigid solar cells are used, they can be segmented and coupled to facilitate rolling and unrolling.

Figure 12A:
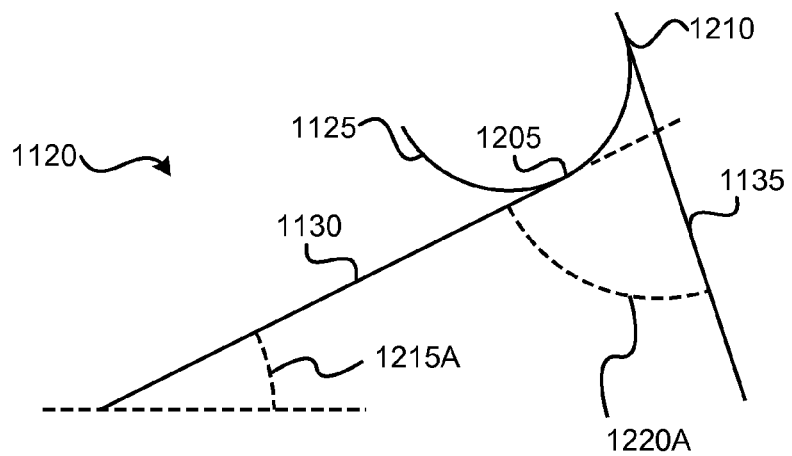
FIGS. 12A-12C illustrate simplified cross-sectional profiles of a collapsible terrestrial solar panel, according to some embodiments.
Figure 12B:
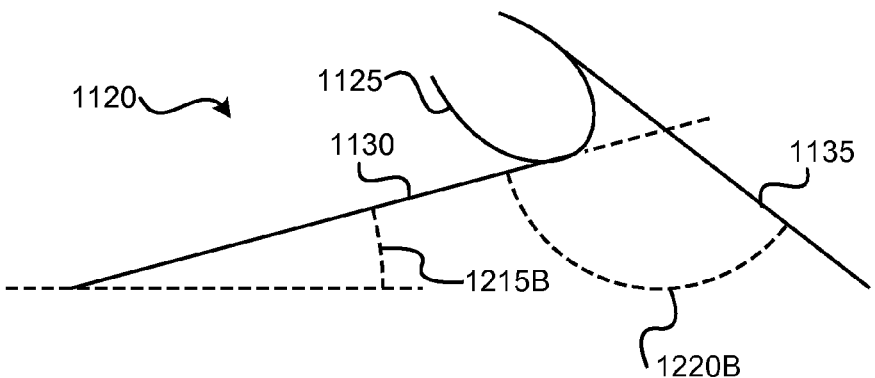
Figure 12C:
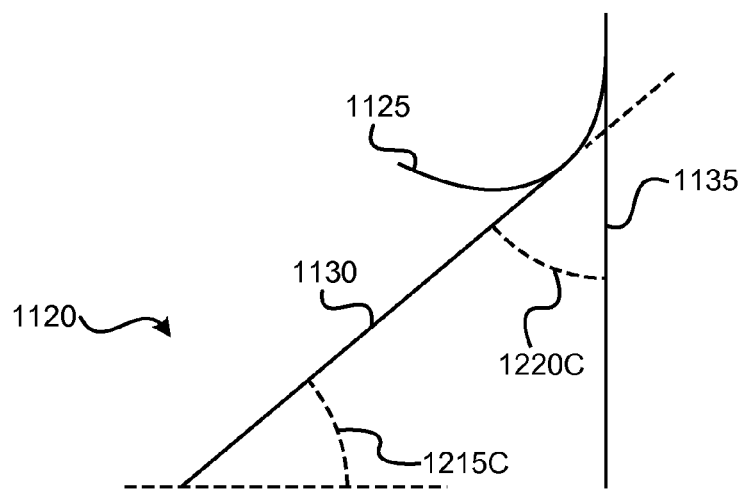

The angle of the front support structure 1130 can be adjusted to improve solar panel efficiency and enable the collapsible terrestrial solar panel to be used at any latitude. FIGS. 12A-12C illustrate simple cross-sectional profiles of a collapsible terrestrial solar panel, which demonstrate how adjustability of the angle 1215 of the front support structure 1130 can be achieved. FIG. 12A, for example, shows how a front supporting structure 1130 is coupled with a longeron 1125 at a first location 1205. A back supporting structure 1135 is coupled with the longeron 1125 at a second location 1210 such that the back supporting structure 1135 is angled with respect to the front supporting structure 1130.

Coupling the front supporting structure 1130 and back supporting structure 1135 with the longeron 1125 can be done in a variety of ways, utilizing a variety of coupling methods. One or both support structures may be coupled at a plurality of positions along the longitudinal length of the longeron 1125 using rivets, bolts, or any of a variety of fastening means. Additionally or alternatively, one or both support structures may be coupled along the entire length of longeron 1125 and/or support structure, or a portion thereof. Various adhering means can be used, such as an epoxy or simple mechanical stitching. Coupling means and techniques can vary depending on the desired functionality and composition of the support structures and/or longeron 1125.

The cross-sectional profile of the longeron 1125 can be deformed to allow one or both support structures to be moved. Moving one or both support structures can change the angle 1220 between support structures, which can cause a change in the angle 1215 of the front support structure 1130. For example, FIG. 12B illustrates how an increased angle 1220B between support structures creates a decreased angle 1215B of the front support structure 1130. On the other hand, FIG. 12C illustrates how an decreased angle 1220C between support structures creates an increased angle 1215C of the front support structure 1130. Depending on desired functionality, the collapsible terrestrial solar panel can be configured to allow the front support structure 1130 to achieve and angle 1215 from 0 degrees to nearly 90 degrees. Because angling the front support structure 1130 to nearly 90 degrees is rarely needed in most applications, other embodiments are configured to enable the front support structure 1130 to achieve angles 1215 from 0 degrees and 60 degrees.

Figure 13:
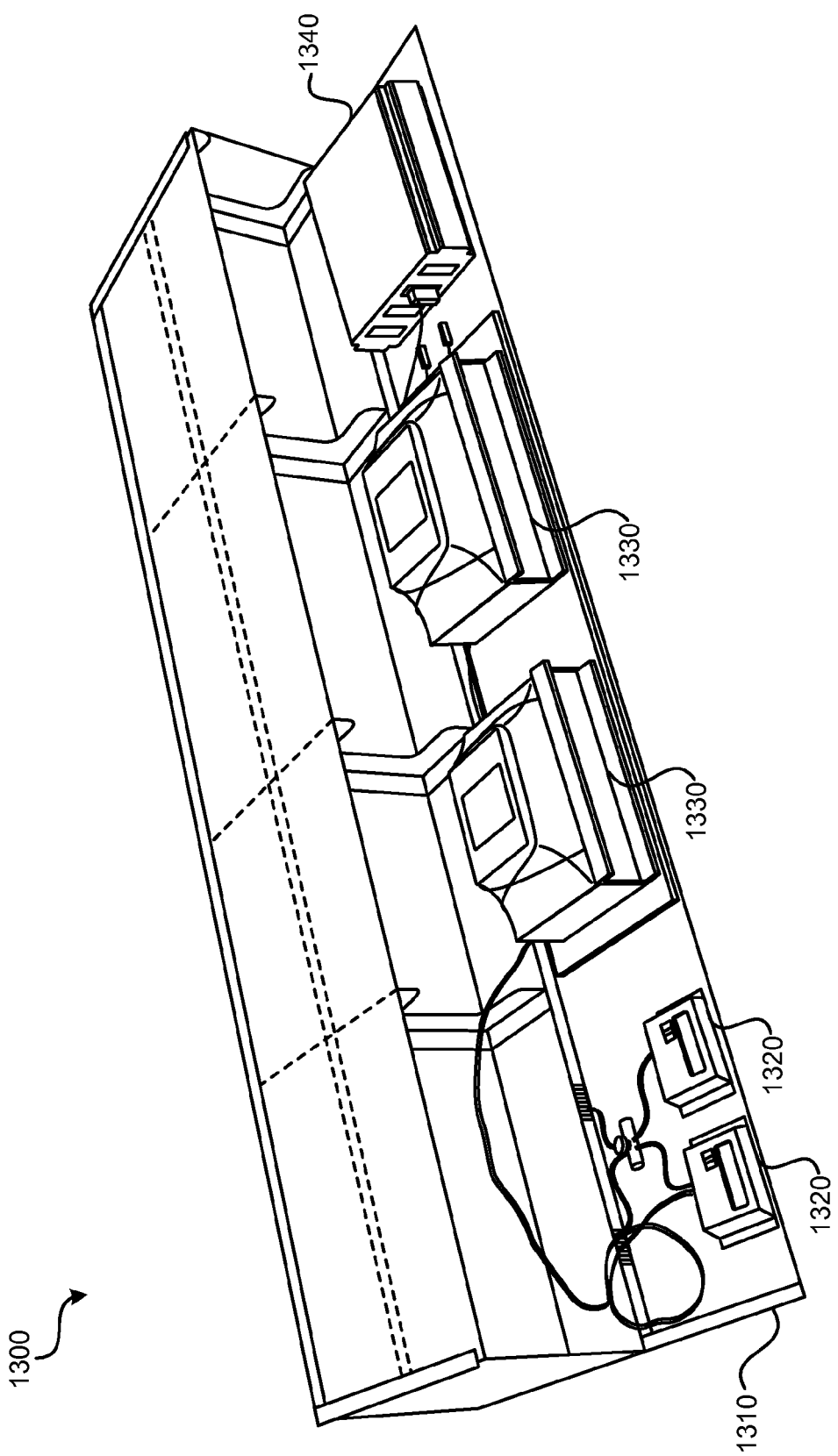
FIG. 13 is an illustration of an embodiment of a stowage and transport box for a terrestrial solar panel.

For ease in transportation and setup, structures may be stowed with associated electronic equipment. FIG. 13 illustrates an embodiment of a stowage and transport box 1300 for a terrestrial solar panel. In addition to housing a collapsible terrestrial solar panel, the stowage and transport box 1300 includes a back door 1310 on which electronic equipment, such as controllers 1320, batteries 1330, and inverter 1340, and/or other electrical components. This configuration allows easy access to the exposed electronic equipment upon opening the back door 1310. Similar structures can be used in the stowage and transport of other collapsible structures.

FIGS. 14A-14C illustrate how the stowage and transport box 1300 of FIG. 13 can be used when a collapsible terrestrial solar panel is in stowed and deployed states. For instance, as shown in FIG. 14A, the collapsible terrestrial solar panel can be stowed as a roll 1110 in a compartment of the stowage and transport box 1300, accessible via a front door 1410. The roll 1110 can then be unrolled as illustrated in FIG. 14B, and ultimately deployed as illustrated in FIG. 14C. Because the stowage and transport box 1300 can house electronic equipment associated with the operation of the solar panel, the deployed collapsible terrestrial solar panel 1120 can be electrically coupled with the electronic equipment using electrical connection 1420.

Figure 15C:
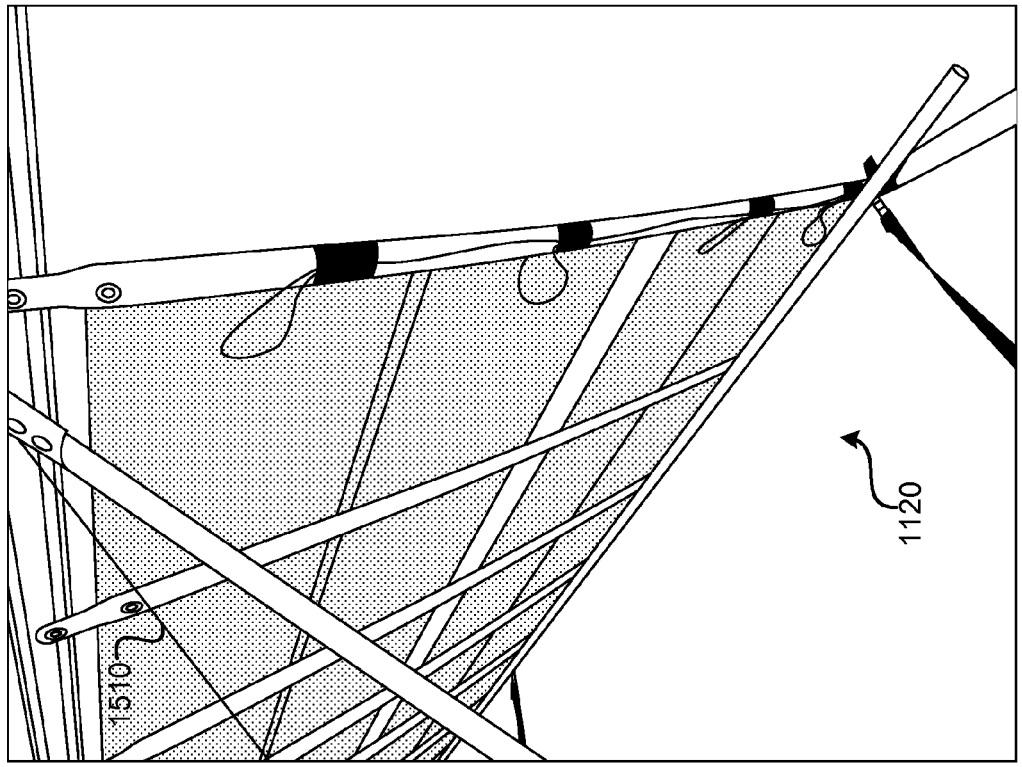
FIGS. 15A-15C are illustrations showing various perspectives of embodiment of a structure in a deployed state, utilizing tensioned diagonal chords.
Figure 15A:
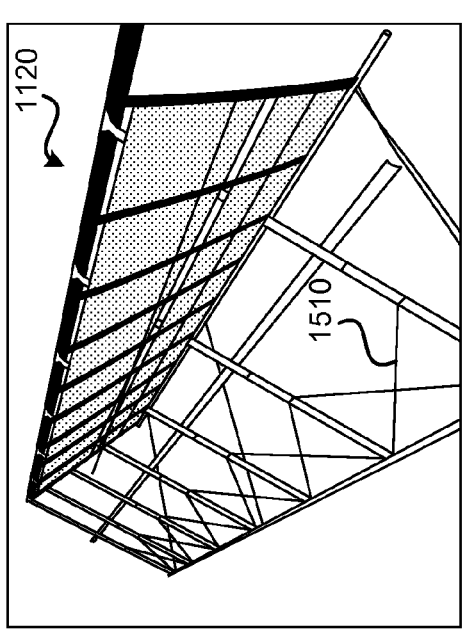
Figure 15B:
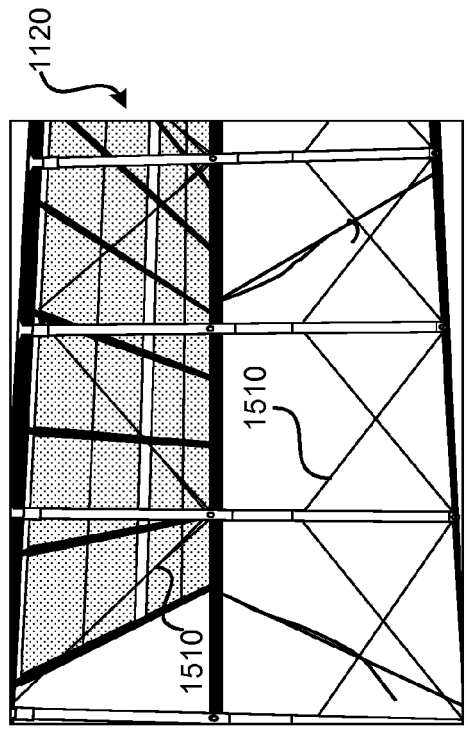

FIGS. 15A-15C are illustrations showing various perspectives of embodiment of a collapsible terrestrial solar panel in a deployed state 1120, utilizing tensioned diagonal chords 1510. The tensioned diagonal chords 1510 can comprise a thread or sheet material made of fabric, metal, nylon, and/or other materials capable of providing an appropriate amount of tension to provide additional structural support.

Figure 16A:
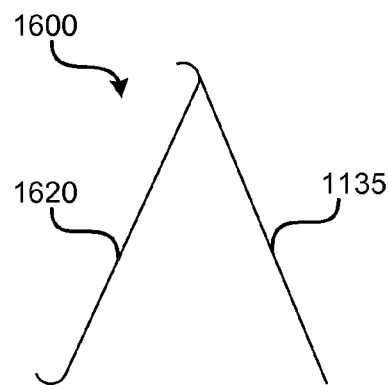
FIGS. 16A-16B are illustrations of an embodiment of a collapsible structure forming an A-frame structure when deployed and utilizing a longeron as the front support structure.
Figure 16B:
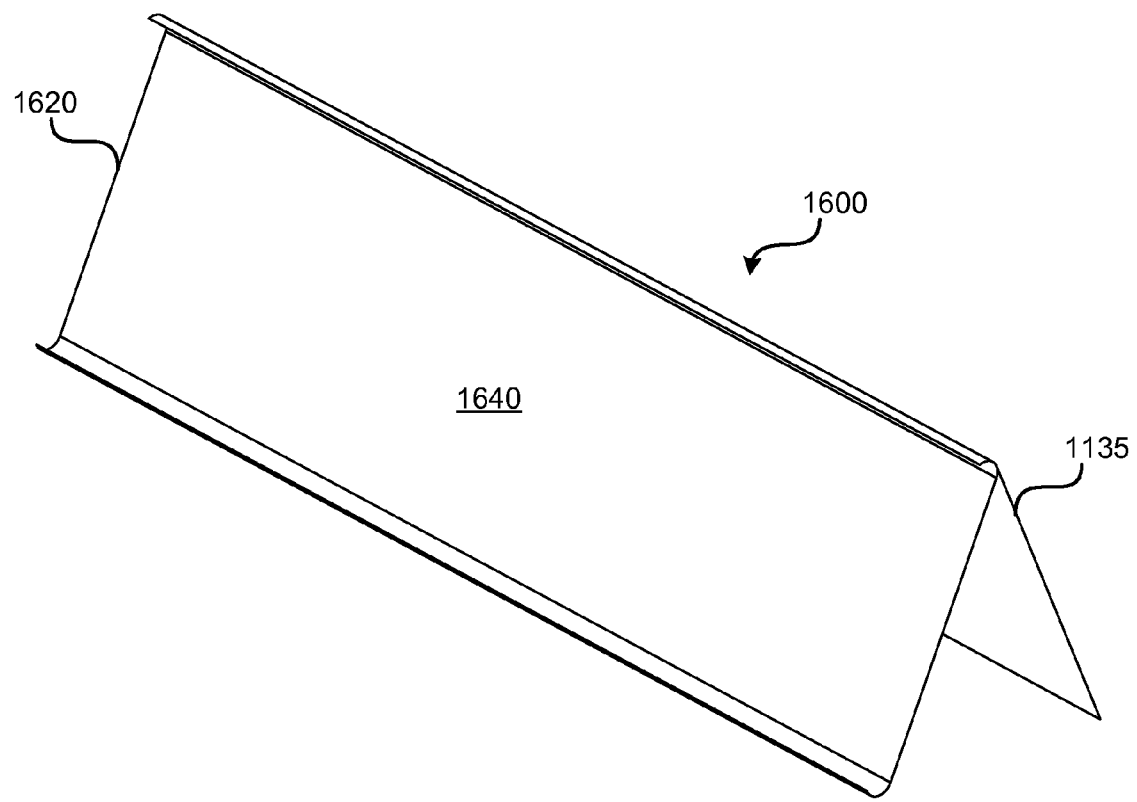

FIGS. 16A-16B are illustrations of another embodiment of a collapsible structure 1600 utilizing a longeron 1620, FIG. 16A showing an end view of the collapsible structure 1600, and FIG. 16B showing a perspective view of the collapsible structure 1600. Similar to other structures disclosed herein, the collapsible structure 1600 includes a longeron 1620 coupled with a back support structure 1135. Here, however, front of the collapsible structure 1600 comprises the longeron 1620 without additional support structures. An inner surface 1640 of the longeron 1620 can be coupled with an active sheet material (e.g., flexible solar array, display, etc.) to form a composite structure which can be stowed and deployed as a single structure.

Figure 17A:
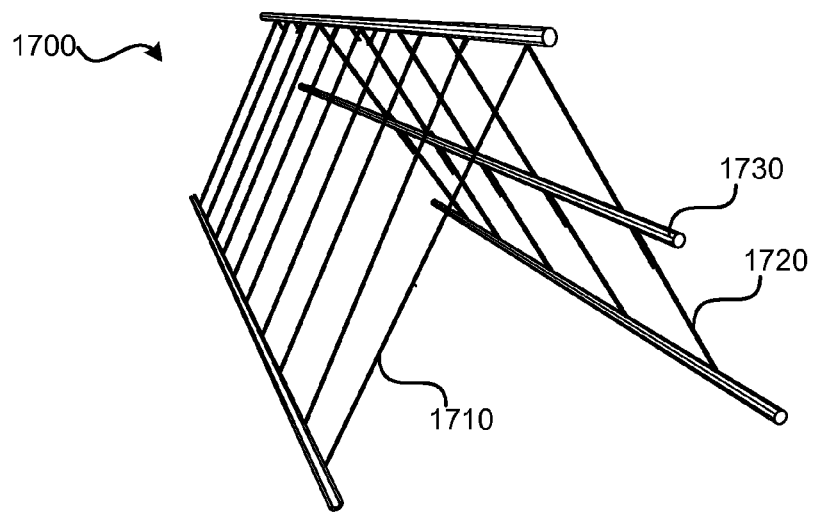
FIGS. 17A-17C are illustrations of an embodiment of a collapsible structure with hinged support structures.
Figure 17B:
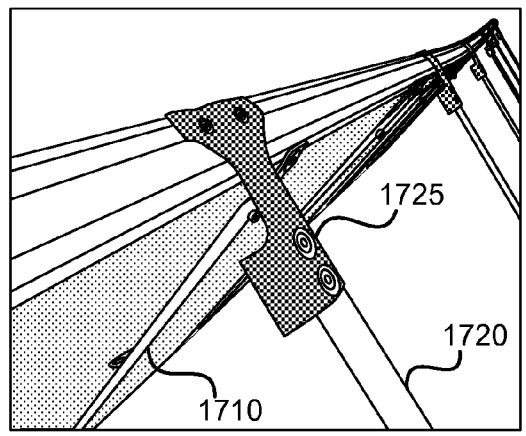
Figure 17C:
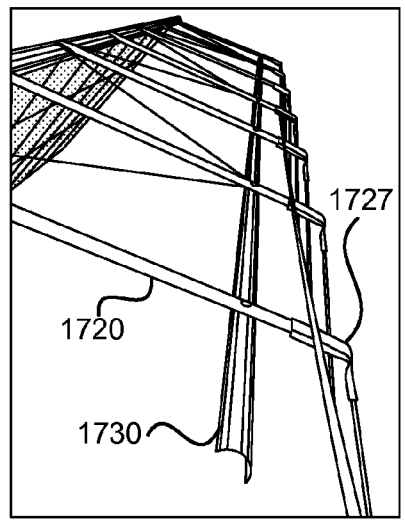

FIGS. 17A-17C are illustrations of an embodiment of a collapsible structure 1700 with hinged back support structures. As with other structures described herein, the collapsible structure 1700 can form an A-frame, with front support structure and back support structure. The front support structure can comprise one or more front support elements 1710, and the back support structure similarly can comprise one or more back support elements 1720. For structures having a plurality of front support elements 1710 and/or back support elements 1720, the front support elements 1710 and/or back support elements 1720 can be connected with an additional support longeron 1730.

Back support elements 1720 additionally can include an upper hinge 1725 to help enable the collapsible structure 1700 to achieve a variety of angles. For example, the upper hinges 1725 of the back support elements 1720 illustrated in FIG. 17B can be deformed to help enable an inner angle between the front support element 1710 and the back support element 1720 to be adjustable. According to one embodiment, the angle between the front support elements 1710 and the back support elements 1720 can vary from 0 to 180 degrees. This enables the front support elements 1710 and the back support elements 1720 to be folded together (for stowage, for example) and/or swung apart at 180 degrees (enabling the collapsible structure 1700 to lie flat on the ground). Additionally or alternatively, upper hinges 1725 can be located on front support elements 1710, depending on desired functionality. Moreover, the deformation of the upper hinges 1725 can be used as an alternative to, or in addition to, the deforming of a cross-sectional profile of an upper longeron 1125, as shown in FIGS. 12A-12C and described in the associated text above, to help enable the collapsible structure 1700 to achieve a variety of angles.

FIG. 17C illustrates how back support elements 1720 can include mid-element hinges 1727. Additionally or alternatively, mid-element hinges 1727 can be located on front support elements 1710, depending on desired functionality. Among other functions, these mid-element hinges 1727 can bend to enable the back support elements 1720 to buckle if a certain amount of force is applied. According to one embodiment, as shown in FIG. 17C, the mid-element hinges 1727 can help enable the back support elements 1720 to buckle when a force is applied to the front of the collapsible structure 1700. Additionally or alternatively, the mid-element hinges 1727 can be configured to buckle if a certain amount of force is applied to the back of the collapsible structure 1700, and/or a certain amount of force is applied to the collapsible structure 1700 in other directions.

Figure 18A:
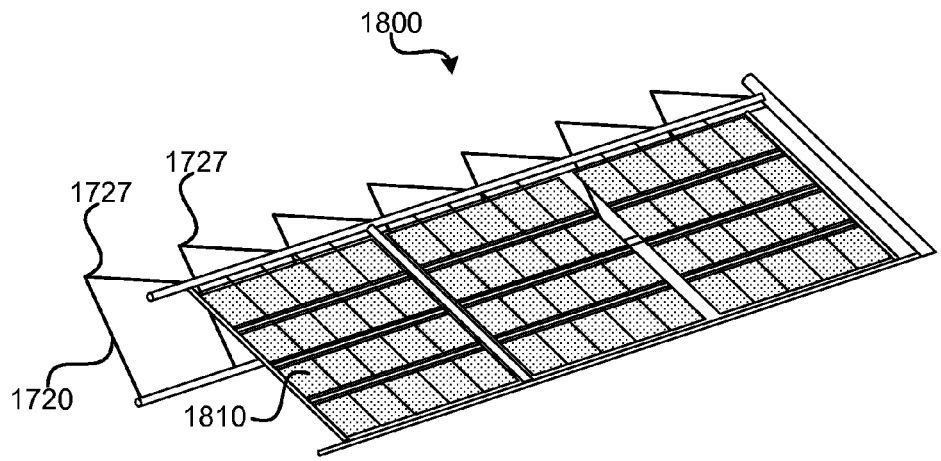
FIGS. 18A-C are illustrations of an embodiment utilizing hinges to enable a structure to withstand certain forces without sustaining permanent damage.
Figure 18B:
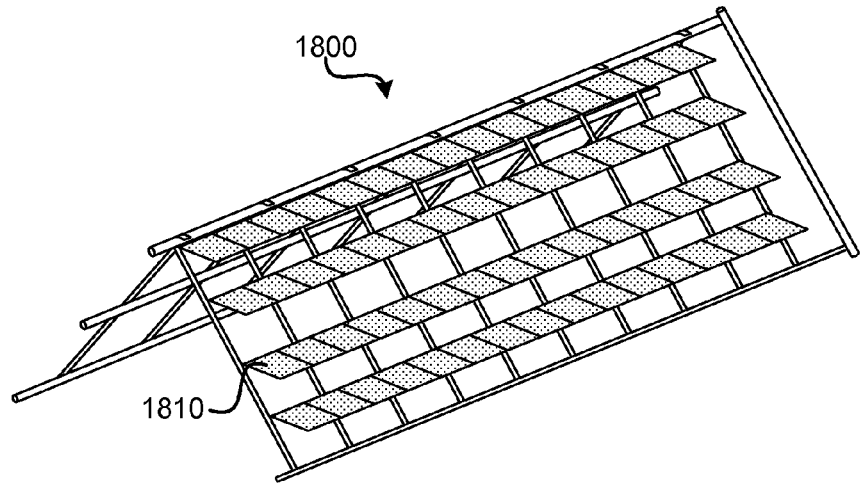
Figure 18C:
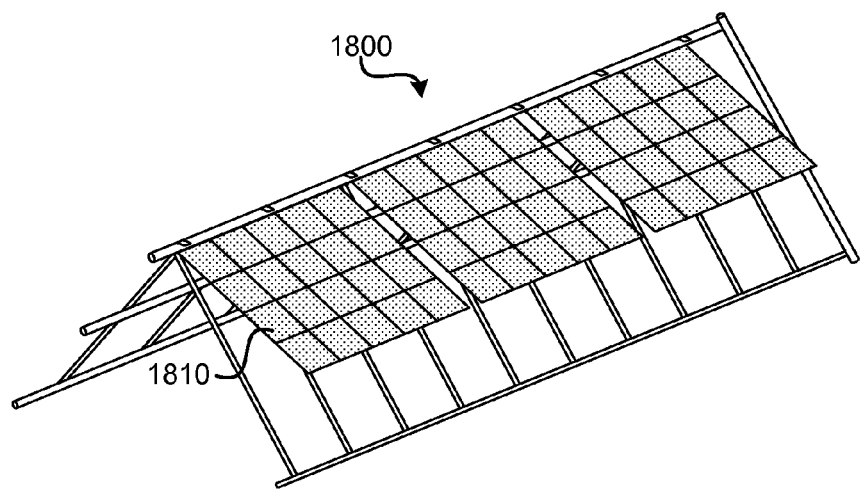

FIGS. 18A-C illustrate how mid-element hinges 1727 can be used in a collapsible solar array structure 1800 to enable the structure to withstand forces, such as wind, applied to the front and the back of the collapsible solar array structure 1800, without sustaining permanent damage. For instance, FIG. 18A illustrates how, when a force is applied to the front of the solar array structure 1800, mid-element hinges 1727 bend, causing the back structural elements 1720 to buckle. According to some embodiments, the structure can lie virtually flat on the ground after the buckling of the back structural elements 1720. Additionally or alternatively, mid-element hinges 1727 may include a restorative force that can cause the back structural elements 1720 to straighten automatically.

FIGS. 18A and 18B illustrate how collapsible solar array structure 1800 can be configured to withstand a similar force from behind the structure. For example, FIG. 18B illustrates how each row of solar panels 1810 can be hinged to swing forward when the force is applied. Alternatively, solar panels 1810 can be grouped in other ways, where each group is hinged separately, as shown in FIG. 18C. Various combinations of the features shown in FIGS. 17A-17C and FIGS. 18A-18C are also contemplated.

Figure 19:
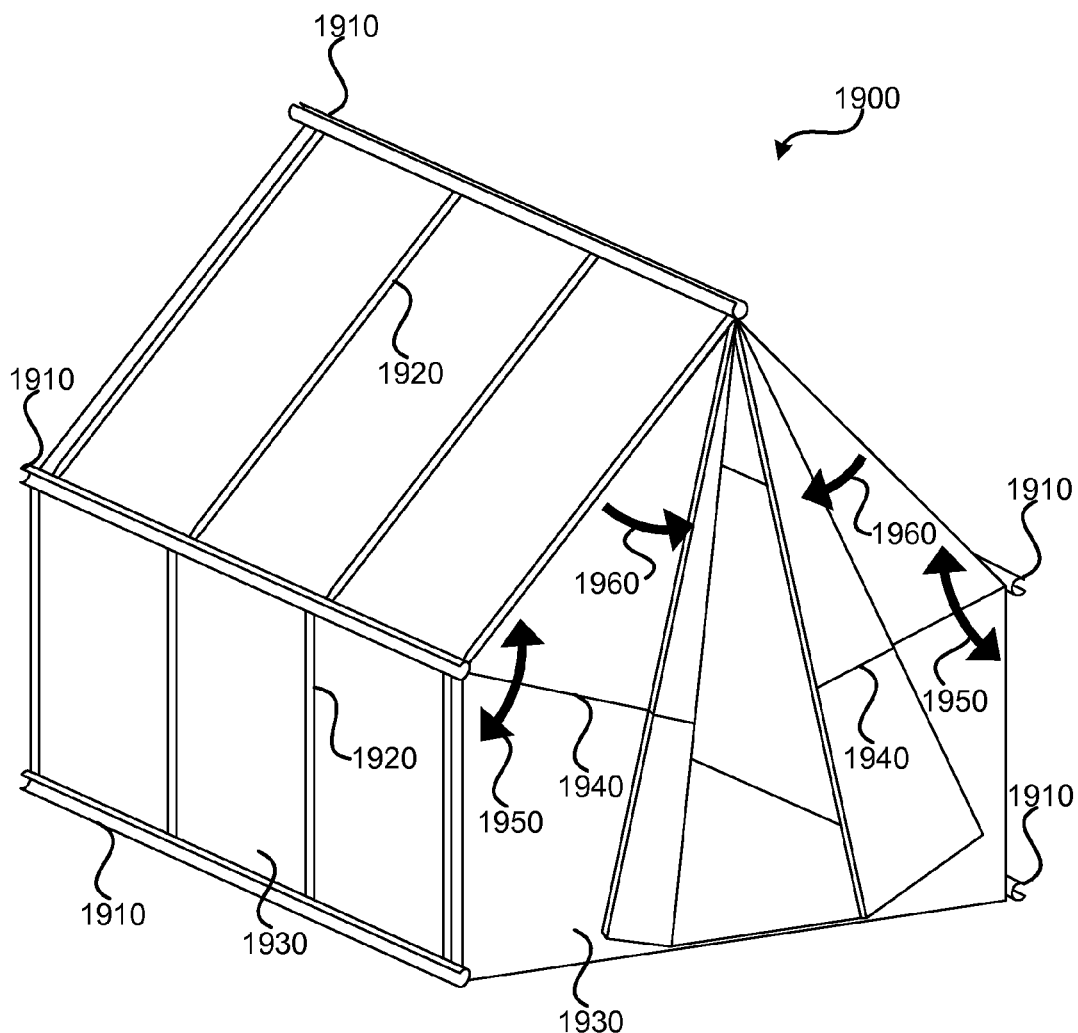
FIG. 19 illustrates a tent structure, according to one embodiment.

Although various figures provided herein illustrate collapsible terrestrial solar panels, various other adjustable structures are contemplated. FIG. 19 illustrates an embodiment comprising a tent structure 1900. As with other structures disclosed herein, the tent structure 1900 can include one or more slit-tube longerons 1910 connected with one or more connecting elements 1920. Sheet material 1930 can comprise a shear web sheet material. To stow the tent structure 1900, zippers 1940 can be unzipped, sides can be straightened, as illustrated by arrows 1950, and the straightened sides can be swung together, as illustrated by arrows 1960. Once the tent structure 1900 is collapsed, it can be rolled in a fashion similar to other structures described herein. Tent structure 1900 can be deployed by reversing the stowing procedure.

Figure 21:
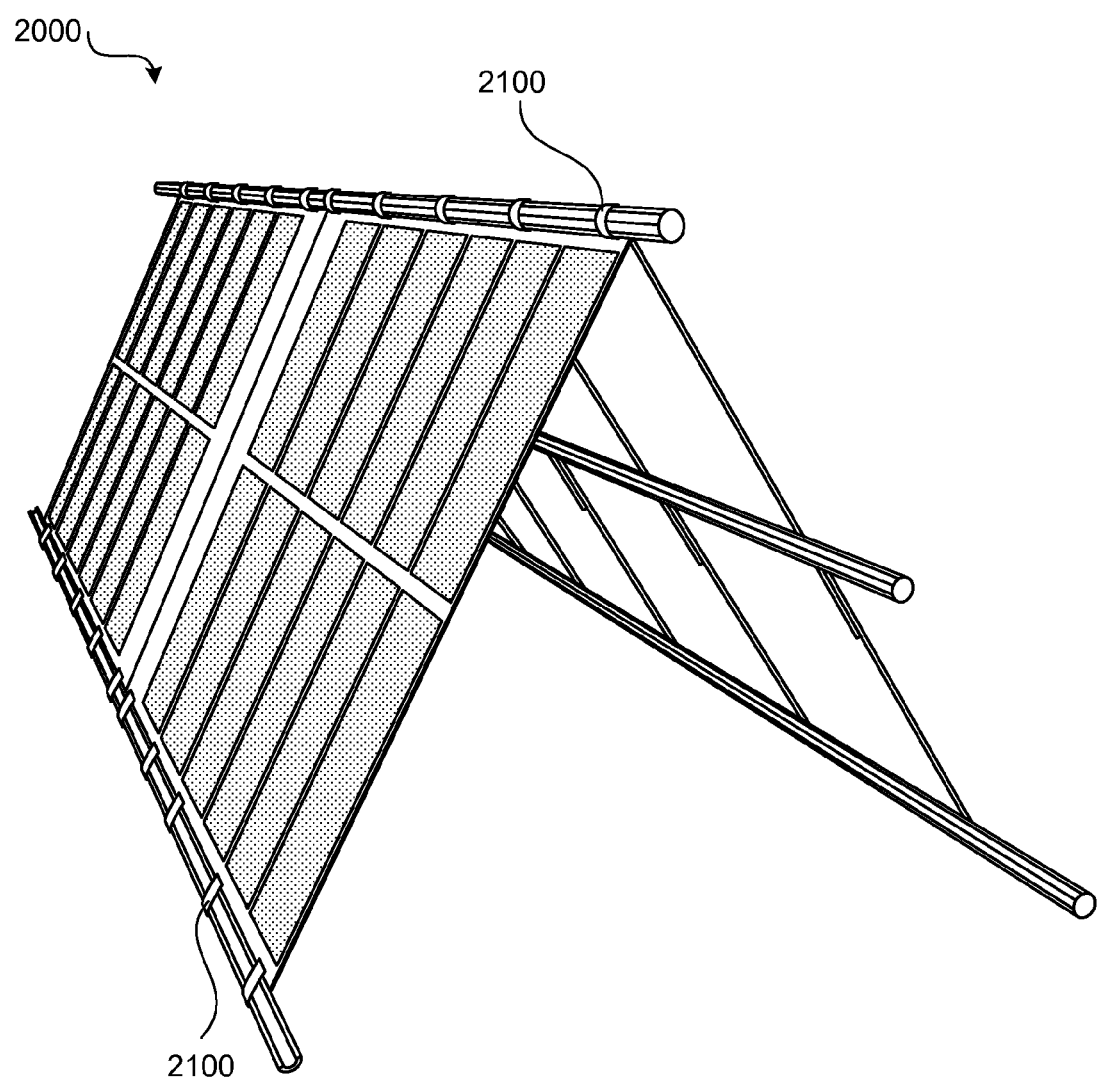
FIG. 21 is a collapsible structure with a solar array attached using hook and loop straps according to some embodiments of the invention.
Figure 22:
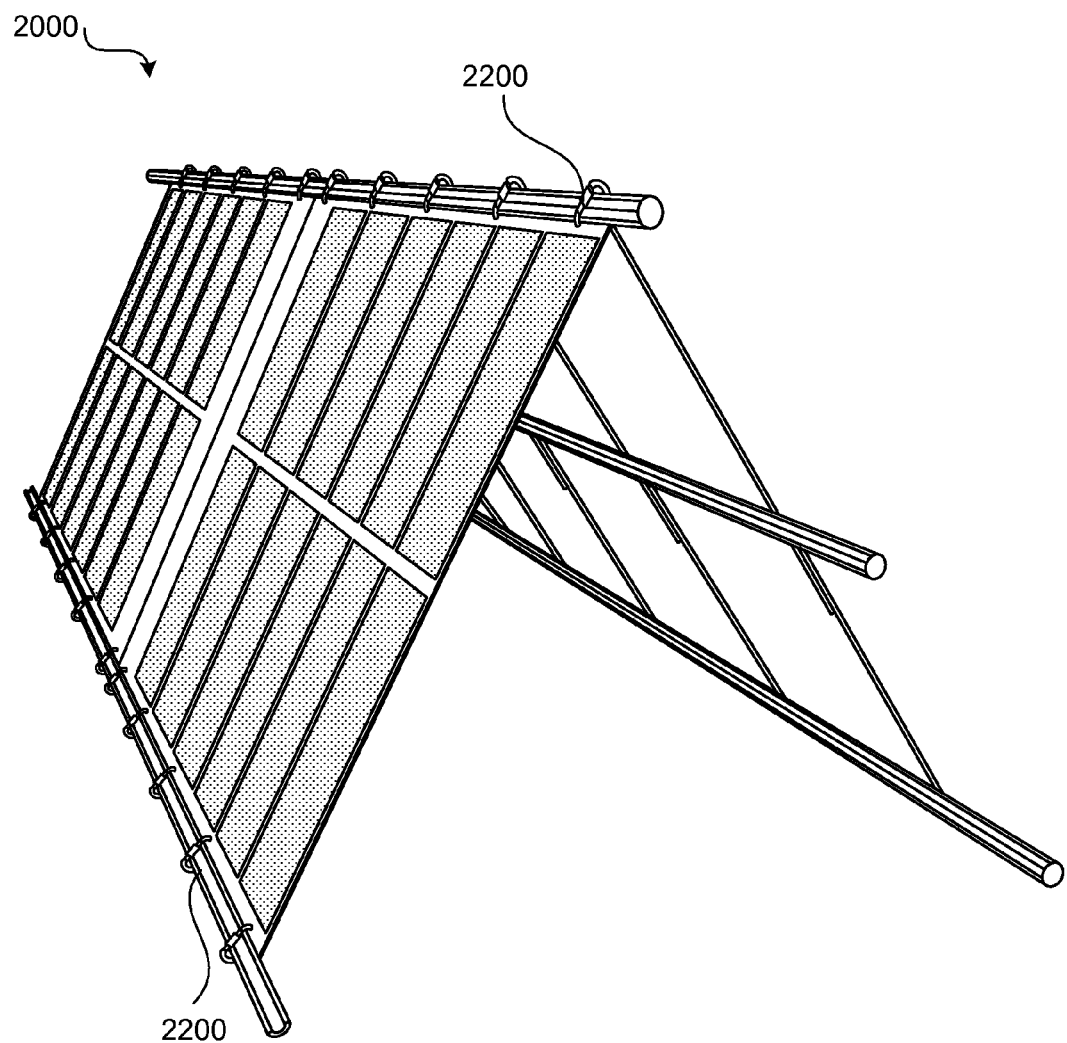
FIG. 22 is a collapsible structure with a solar array attached using caribeeners according to some embodiments of the invention.

Some embodiments of the invention have been described as including a collapsible (or deployable structure) utilizing longerons coupled with a solar array. Embodiments of the invention can also include stand alone structures without a solar array and/or a collapsible structure with a detachable solar array. In the later, collapsible structures can be stowed separate from the solar array, deployed and then have the solar array coupled thereto. FIGS. 20, 21 and 22 show some embodiments of collapsible structures with a detachable solar array. These embodiments can include features, embodiments or examples described previously but with detachable solar arrays that are stowed separately.

Figure 20A:
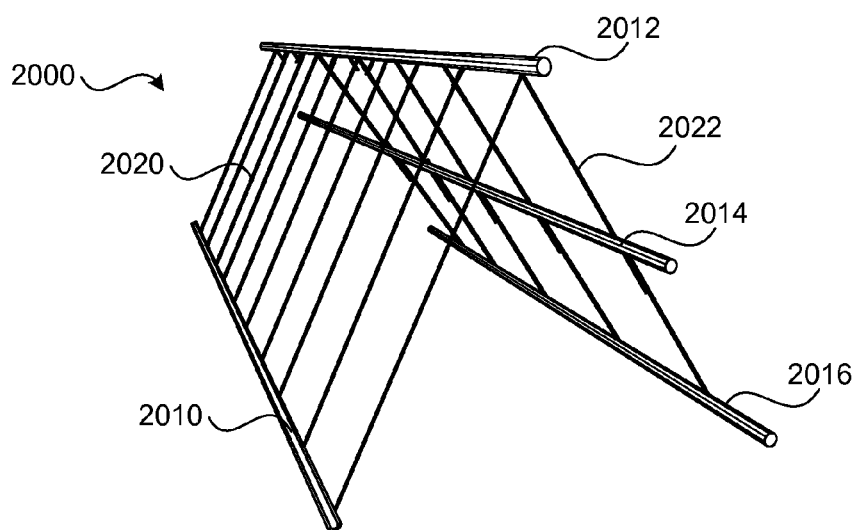
FIG. 20A is collapsible structure without a solar array in the deployed configuration according to some embodiments of the invention.

FIG. 20A shows collapsible structure 2000 without a solar array in the deployed configuration according to some embodiments of the invention. Collapsible structure 2000 includes first longeron 2010 and second longeron 2012. Support elements 2020 are disposed between first longeron 2010 and second longeron 2012. Additional longerons may also be coupled with support elements 2020. Third longeron 2014 and fourth longeron 2016 can also be included. These longerons can also include support elements 2022 that extend between fourth longeron 2016 and second longeron 2012. In some embodiments, third longeron 2014 and/or fourth longeron 2016 may not be used. These longerons can have a slit or gap along the longitudinal length of the longeron. Moreover, the longerons can include any type of longeron described herein.

Collapsible structure 2000 can be collapsed and rolled up along the length of the longerons into a stowed configuration. In the stowed configuration each longeron can be flattened and rolled along its longitudinal length. Thus, collapsible structure 2000 can be stowed without a solar array. When collapsed, back side 2050 and front side 2055 of collapsible structure 2000 can be flattened together and rolled up along the longitudinal length of the longerons.

Figure 20B:
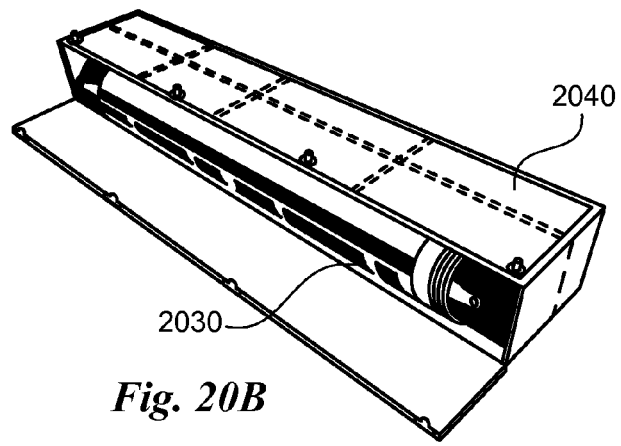
FIG. 20B is a solar array stowed in a stowage box according to some embodiments of the invention.

FIG. 20B shows solar array 2030 stowed in stowage box 2040 according to some embodiments of the invention. Solar array 2030 is stowed without a collapsible or other structure. Solar array 2030 can include a photovoltaic blanket that may include photovoltaic cells, such as, for example, silicon photovoltaic cells. The photovoltaic blanket can include thin film photovoltaics on a structural substrate or rigid cell photovoltaics on a mesh fabric. The photovoltaic cells may be grouped into panels. The photovoltaic cells may also be thin film photovoltaic cells. For example, the photovoltaic cells may include an amorphous silicon alloy or copper indium gallium deselinide cells deposited on a thin metallic or polyimide substrate. In other embodiments, solar array 2030 can be stowed in other configurations separately from the stowage of collapsible structure 2000. Solar array 2030, for example, can be folded.

Figure 20C:
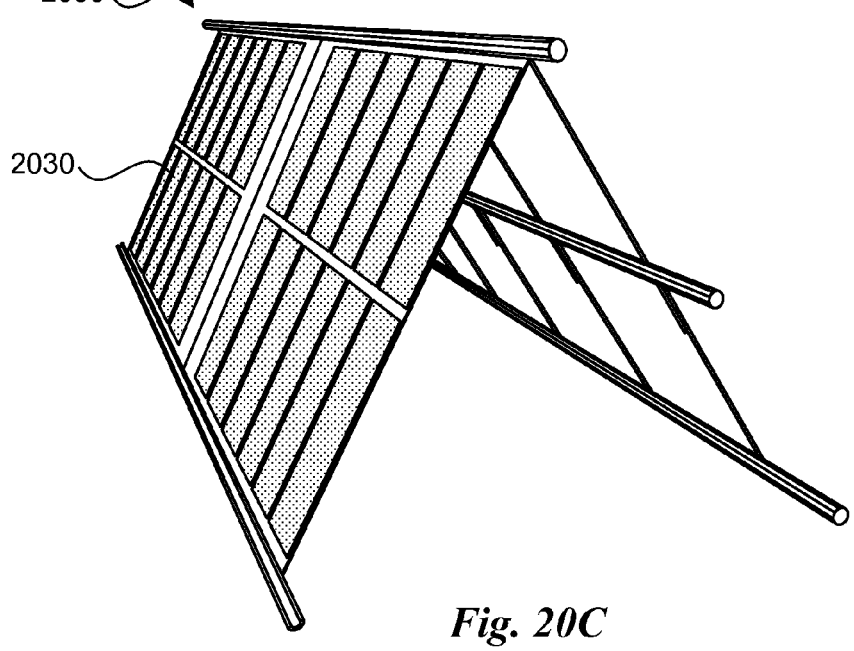
FIG. 20C is a collapsible structure with an attached solar array according to some embodiments of the invention.

FIG. 20C shows collapsible structure 2000 with detachable solar array 2030 coupled thereto according to some embodiments of the invention. Solar array 2030 can be coupled with the longerons and/or support elements of collapsible structure 2000. Solar array 2030 shown in the figure can be one large solar array that covers most or all of collapsible structure 2000. In other configurations, solar array 2030 can includes a plurality of separate solar array sheets coupled with collapsible structure 2000. Multiple solar array 2030 structures can be electrically coupled together.

Solar array 2030 can be coupled with collapsible structure 2000 using any number of attachment mechanisms or means. For example, solar array 2030 can include a plurality of hook-and-loop (Velcro) straps. These straps may include either a strip of hook material or a strip of loop material. A portion of the back side of the solar array can include the other of the strip of the hook material or the strip of loop material. Solar array 2030 can then be secured with the collapsible structure by wrapping the strap around a longeron or a support element and securing the strap using the hook-and-loop material to the back of solar array 2030. FIG. 21 shows collapsible structure 2000 coupled with solar array 2030 using hook and loop straps 2100.

In another embodiment, the back of solar array 2030 can include either a strip of hook material or a strip of loop material. Collapsible structure 2000 can then include the other of the strip of hook material or a strip of loop material. Solar array 2030 can be coupled with collapsible structure 2000 be coupling the hook-and-loop materials.

In another embodiment, solar array 2030 can include a plurality of snap fasteners. Solar array 2030 can include a plurality of male or female snap portions and collapsible structure 200 can include a plurality of the opposite snap portions. Solar array 2030 can then be coupled with collapsible structure 2000 using these snaps. In some embodiments, solar array 2030 can also include a plurality of straps that can wrap around portions of solar array structure 2000 and snap with a portion of the strap or the solar array. Buttons can similarly be used instead of snaps.

In another embodiments solar array 2030 can include a plurality of carabineers 2200 that are used to couple solar array 2030 to collapsible structure 2000. Carabineers 2200 can be used to couple directly with a longeron or support element. In some configurations, structure 2000 can include a plurality of clips, hooks, rings, grommets, etc. that can be coupled with carabineer 2200. The solar array can be coupled with the collapsible structure using the carabineers and the clips, hooks, snaps, rings, or grommets. Conversely, the solar array can include the clips, hooks, rings, snaps, and/or grommets and the collapsible structure can include the plurality of carabineers.

In other embodiments the solar array can be coupled with the collapsible structure after deployment using clips, grommets, buckles, pins, clevis pins, cotter pins, linchpins, R-clips, and/or spring clips.

The description provided hereinabove contemplates various structures not explicitly described or shown in the figures. For example, although many figures provided illustrate slit-tube longerons having a U-shaped or semi-circular cross-sectional profiles, other types of longerons are contemplated. Embodiments can include, for example and not by way of limitation, longerons having a curved cross-sectional profile, such as an oval-shaped profile. Other embodiments can include longerons having a profile that is substantially flat with one or more curved edges. Moreover, some embodiments can include longerons with cross-sectional profiles having roughly straight edges, such as a polygonal profile, as well as closed-out cross-sectional profiles (i.e., profiles having no slit).

Having fully described several embodiments, many other equivalent or alternative embodiments of deployable structures utilizing collapsible members will be apparent to those of skill in the art. These alternatives and equivalents are intended to be included within the scope of the invention, as defined by the following claims.

What is claimed is:

1. A collapsible solar array structure comprising:
   a collapsible structure comprising:
      a first longeron having a slit along a longitudinal length of the longeron; and
      a second longeron having a slit along a longitudinal length of the longeron; and
   a solar array detachably coupled with the deployable structure,
   wherein the deployable solar array structure includes a stowed and a deployed configuration,
   wherein in the stowed configuration the collapsible structure is rolled along a longitudinal length of one of the plurality of longerons,
   wherein the solar array is detached from the collapsible structure in the stowed configuration, and
   wherein in the deployed configuration the longerons are extended longitudinally and the solar array is coupled with the deployable structure.

2. The deployable solar array structure according to claim 1, wherein the solar array comprises a plurality of attachment mechanism configured to couple with the deployable structure.

3. The deployable solar array structure according to claim 2, wherein the attachment mechanisms comprise attachment mechanisms selected from the group consisting of: Velcro, clips, snaps, buttons, grommets, carabineers, clips, buckles, pins, clevis pins, cotter pins, linchpins, R-clips, and spring clips.

4. The deployable solar array structure according to claim 1, wherein the collapsible structure comprises a plurality of attachment mechanism configured to couple with the solar array.

5. The deployable solar array structure according to claim 2, wherein the attachment mechanisms comprise attachment mechanisms selected from the group consisting of: Velcro, clips, snaps, buttons, grommets, carabineers, clips, buckles, pins, clevis pins, cotter pins, linchpins, R-clips, and spring clips.

6. The deployable solar array structure according to claim 1, wherein in the stowed configuration the solar array is stowed separately from the deployable structure.

7. The deployable solar array structure according to claim 1, wherein the solar array comprises a plurality of photo voltaic cells.

8. The deployable solar array structure according to claim 1, wherein in the stowed configuration the solar array is folded.

9. The deployable solar array structure according to claim 1, wherein the collapsible structure further comprises a first plurality of support elements coupled with both the first longeron and the second longeron.

10. The deployable solar array structure according to claim 9, wherein each of the first plurality of support elements comprise elongated members having two ends, wherein the support elements are couple with first longeron at one of the two ends and couple with the second longeron at the other of the two ends.

11. A method for deploying a solar array structure comprising:
   unrolling a collapsible structure from the deployable structure's stowed configuration into an unrolled configuration,
      wherein the collapsible structure comprises a plurality of longerons having a slit along a longitudinal length of the longeron,
      wherein in the stowed configuration the collapsible structure is rolled along a longitudinal length of one of the plurality of longerons,
      wherein in the unrolled configuration the longerons are extended longitudinally; and
   coupling a solar array with the collapsible structure when the collapsible structure is in the unrolled configuration.

12. The deployable solar array structure according to claim 1, further comprising an additional longeron coupled with the first plurality of support elements between the first longeron and the second longeron.

13. The deployable solar array structure according to claim 1, wherein in the stowed configuration the first longeron and the second longeron are flattened.

14. The deployable solar array structure according to claim 1, further comprises:
   a third longeron having a slit along a longitudinal length of the longeron; and
   a second plurality of support elements coupled with the third longeron and the second longeron.

15. The method according to claim 11, further comprising unfolding the solar array separately from unrolling the deployable structure.

16. The method according to claim 11, further comprising deploying the collapsible structure into a deployed configuration.

17. The method according to claim 16, wherein in the deployed configuration the deployed structure comprise an A-frame shape.

18. The method according to claim 16, wherein in the deployed configuration at least one of the plurality of longerons is positioned above another of the plurality of longerons.

19. The method according to claim 11, wherein the coupling of the solar array with the collapsible structure comprises detachably coupling the solar array with the deployable structure.

20. A collapsible structure comprising:
   a plurality of longerons having a slit along a longitudinal length of each longeron;
   a plurality of support elements, wherein each of the plurality of support elements are coupled with at least two of the plurality of longerons; and
   attachment means for coupling a solar array with the deployable structure, wherein the attachment means are coupled with either or both of one or more longerons and one or more support elements, wherein the collapsible structure includes a stowed configuration, wherein in the stowed configuration the collapsible structure is rolled along a longitudinal length of the plurality of longerons, wherein the collapsible structure includes a deployed configuration, and wherein in the deployed configuration the plurality of longerons are extended longitudinally.

21. The collapsible structure according to claim 20, wherein at least a subset of the plurality of support elements comprise a composite material.

22. The collapsible structure according to claim 20, wherein at least a subset of the plurality of longerons comprise a composite material.

23. The collapsible structure according to claim 20, wherein the attachment means comprise Velcro, clips, snaps, buttons, grommets, carabineers, clips, buckles, pins, clevis pins, cotter pins, linchpins, R-clips, and spring clips.

24. The collapsible structure according to claim 20, further comprising a solar array comprising second attachment means that are configured to couple with the attachment means.

25. A collapsible structure comprising:
a plurality of longerons having a slit along a longitudinal length of each longeron; and
a solar array comprising attachment means for detachably coupling the solar array with either or both of one or more longerons and one or more support elements,
wherein the collapsible structure includes a stowed configuration,
wherein in the stowed configuration the collapsible structure is rolled along a longitudinal length of the plurality of longerons and the solar array is not coupled with either or both of one or more longerons and one or more support elements,
wherein the collapsible structure includes a deployed configuration, and
wherein in the deployed configuration the plurality of longerons are extended longitudinally and the solar array is coupled with either or both of one or more longerons and one or more support elements.

26. The collapsible structure according to claim 25, further comprising a plurality of support elements, wherein each of the plurality of support elements are coupled with at least two of the plurality of longerons.

27. The collapsible structure according to claim 26, wherein at least a subset of the plurality of support elements comprise a longeron having a slit along a longitudinal length of each longeron.

28. The collapsible structure according to claim 26, wherein at least a subset of the plurality of support elements comprise a composite material.

29. The collapsible structure according to claim 25, wherein at least a subset of the plurality of longerons comprise a composite material.

30. The collapsible structure according to claim 25, wherein the attachment means comprise Velcro, clips, snaps, buttons, grommets, carabineers, clips, buckles, pins, clevis pins, cotter pins, linchpins, R-clips, and spring clips.

31. The collapsible structure according to claim 25, further comprising a solar array comprising second attachment means that are configured to couple with the attachment means.

* * * * *